United States Patent
Liu et al.

(10) Patent No.: US 11,825,535 B2
(45) Date of Patent: Nov. 21, 2023

(54) MESSAGING FOR UNMANNED AERIAL VEHICLE SIDELINK COMMUNICATIONS

(71) Applicant: QUALCOMM Incorporated, San Diego, CA (US)

(72) Inventors: Le Liu, Fremont, CA (US); Alberto Rico Alvarino, San Diego, CA (US); Umesh Phuyal, San Diego, CA (US); Stefano Faccin, San Ysidro, CA (US); Xiao Feng Wang, San Diego, CA (US); Juan Montojo, San Diego, CA (US); Francesco Pica, San Diego, CA (US); Chiranjib Saha, Blacksburg, VA (US); Vishnu Vardhan Chetlur Ravi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 258 days.

(21) Appl. No.: 17/193,806

(22) Filed: Mar. 5, 2021

(65) Prior Publication Data
US 2022/0287114 A1    Sep. 8, 2022

(51) Int. Cl.
*H04W 76/14* (2018.01)
*H04W 76/27* (2018.01)
(Continued)

(52) U.S. Cl.
CPC ........... *H04W 76/14* (2018.02); *H04L 1/1819* (2013.01); *H04W 8/24* (2013.01); *H04W 72/20* (2023.01);
(Continued)

(58) Field of Classification Search
CPC ....... H04W 76/14; H04W 8/24; H04W 72/20; H04W 76/27; H04W 92/18; H04W 4/46; H04L 1/1819
See application file for complete search history.

(56) References Cited

U.S. PATENT DOCUMENTS

2018/0233055 A1* 8/2018 Damnjanovic ........... G01S 5/14
2021/0044956 A1    2/2021 Kim

FOREIGN PATENT DOCUMENTS

DE    102018102112 A1 *  8/2019
WO    WO-2021003475 A1    1/2021
(Continued)

OTHER PUBLICATIONS

"3rd Generation Partnership Project; Technical Specification Group Radio Access Network; NR; Radio Resource Control (RRC) protocol specification (Release 16)", 3GPP Standard; Technical Specification; 3GPP TS 38.331, 3rd Generation Partnership Project (3GPP), Mobile Competence Centre, 650, Route Des Lucioles, F-06921, Sophia-Antipolis Cedex, France, vol. Ran WG2, No. V16.3.1, Jan. 7, 2021 (Jan. 7, 2021), pp. 1-929, XP051999705, Retrieved from the Internet: URL: https://ftp.3gpp.org/Specs/archive/38_series/38.331/38331-g31.zip38331-g31.docx [retrieved on Jan. 7, 2021] paragraph [05.8], Section 5.8.9, Section 6.6.

(Continued)

*Primary Examiner* — Ricky Q Ngo
*Assistant Examiner* — Stephen N Steiner
(74) *Attorney, Agent, or Firm* — Harrity & Harrity, LLP

(57) ABSTRACT

Various aspects of the present disclosure generally relate to wireless communication. In some aspects, a first user equipment (UE) may establish a PC5 unicast link with a second UE. The UE may transmit, to a second UE in a PC5 radio resource control (RRC) message, capability information that includes an indication that the first UE is an unmanned aerial vehicle (UAV). Numerous other aspects are described.

31 Claims, 14 Drawing Sheets

(51) Int. Cl.
*H04L 1/1812* (2023.01)
*H04W 8/24* (2009.01)
*H04W 72/20* (2023.01)
*H04W 84/06* (2009.01)
*H04W 92/18* (2009.01)

(52) U.S. Cl.
CPC ............ *H04W 76/27* (2018.02); *H04W 84/06* (2013.01); *H04W 92/18* (2013.01)

(56) References Cited

FOREIGN PATENT DOCUMENTS

| WO | WO-2021010764 A1 | | 1/2021 |
|----|------------------|---|--------|
| WO | WO-2022124962 A1 | * | 6/2022 |

OTHER PUBLICATIONS

International Search Report and Written Opinion—PCT/US2022/070358—ISA/EPO—dated May 11, 2022.

* cited by examiner

MESSAGING FOR UNMANNED AERIAL VEHICLE SIDELINK COMMUNICATIONS

FIELD OF THE DISCLOSURE

Aspects of the present disclosure generally relate to wireless communication and to techniques and apparatuses for messaging for unmanned aerial vehicle (UAV) sidelink communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first user equipment (UE) includes establishing a PC5 unicast link with a second UE; and transmitting, to the second UE in a PC5 radio resource control (RRC) message, capability information that includes an indication that the first UE is an unmanned aerial vehicle (UAV).

In some aspects, a method of wireless communication performed by a first UE includes receiving, from a second UE in a PC5 RRC message, capability information that includes an indication that the second UE is a UAV; receiving, from the second UE, sidelink control information (SCI) associated with a sidelink communication from the second UE, wherein the SCI includes information relating to a height of the second UE; and selectively transmitting, to the second UE, hybrid automatic repeat request (HARQ) feedback for the sidelink communication based at least in part on a distance between the first UE and the second UE determined using the information relating to the height of the second UE.

In some aspects, a first UE for wireless communication includes a memory and one or more processors, operatively coupled to the memory, configured to: establish a PC5 unicast link with a second UE; and transmit, to the second UE in a PC5 RRC message, capability information that includes an indication that the first UE is a UAV.

In some aspects, a first UE for wireless communication includes a memory and one or more processors, operatively coupled to the memory, configured to: receive, from a second UE in a PC5 RRC message, capability information that includes an indication that the second UE is a UAV; receive, from the second UE, SCI associated with a sidelink communication from the second UE, wherein the SCI includes information relating to a height of the second UE; and selectively transmit, to the second UE, HARQ feedback for the sidelink communication based at least in part on a distance between the first UE and the second UE determined using the information relating to the height of the second UE.

In some aspects, a non-transitory computer-readable medium storing a set of instructions for wireless communication includes one or more instructions that, when executed by one or more processors of a first UE, cause the first UE to: establish a PC5 unicast link with a second UE; and transmit, to the second UE in a PC5 RRC message, capability information that includes an indication that the first UE is a UAV.

In some aspects, a non-transitory computer-readable medium storing a set of instructions for wireless communication includes one or more instructions that, when executed by one or more processors of a first UE, cause the first UE to: receive, from a second UE in a PC5 RRC message, capability information that includes an indication that the second UE is a UAV; receive, from the second UE, SCI associated with a sidelink communication from the second UE, wherein the SCI includes information relating to a height of the second UE; and selectively transmit, to the second UE, HARQ feedback for the sidelink communication based at least in part on a distance between the first UE and the second UE determined using the information relating to the height of the second UE.

In some aspects, an apparatus for wireless communication includes means for establishing a PC5 unicast link with a UE; and means for transmitting, to the UE in a PC5 RRC message, capability information that includes an indication that the apparatus is a UAV.

In some aspects, an apparatus for wireless communication includes means for receiving, from a UE in a PC5 RRC message, capability information that includes an indication that the UE is a UAV; means for receiving, from the UE, SCI associated with a sidelink communication from the UE, wherein the SCI includes information relating to a height of the UE; and means for selectively transmitting, to the UE, HARQ feedback for the sidelink communication based at least in part on a distance between the apparatus and the UE determined using the information relating to the height of the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, radio frequency (RF) chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
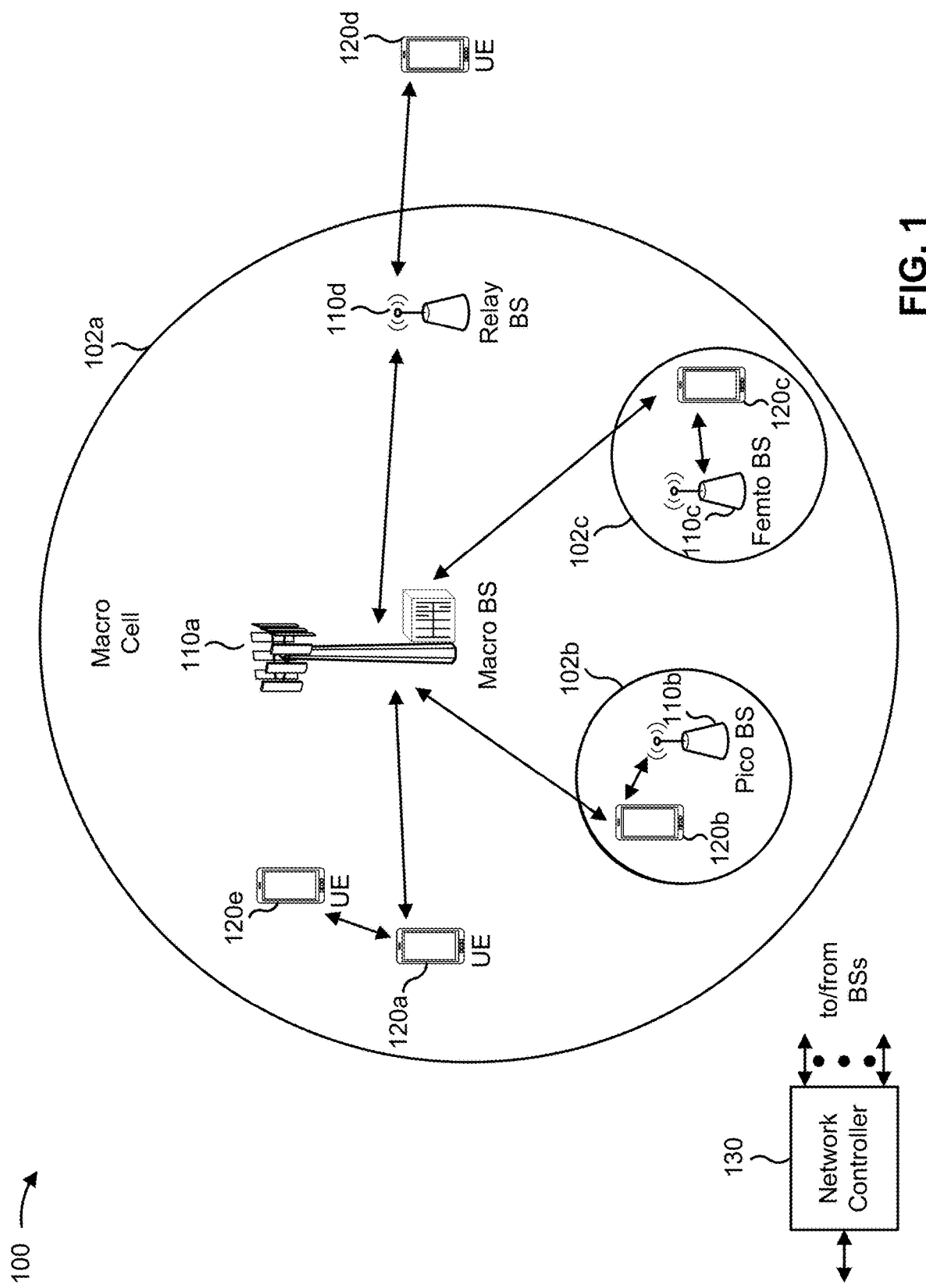
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, unmanned aerial vehicles (UAVs) (e.g., drones), remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
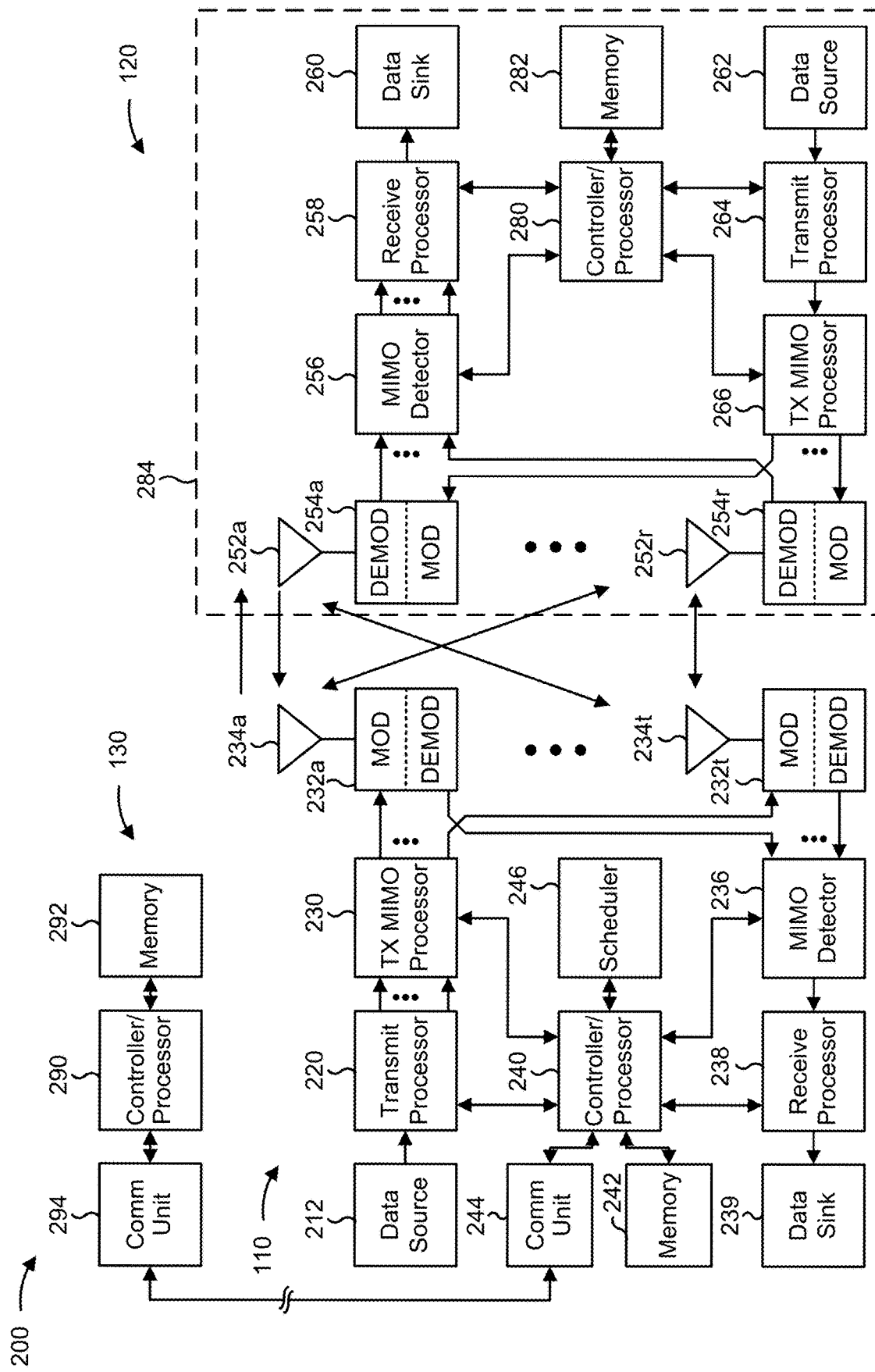
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 7-13.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 7-13.

Controller/processor 240 of base station 110, controller/processor 280 of UE 120, and/or any other component(s) of FIG. 2 may perform one or more techniques associated with messaging for UAV sidelink communications, as described in more detail elsewhere herein. For example, controller/processor 240 of base station 110, controller/processor 280 of UE 120, and/or any other component(s) of FIG. 2 may perform or direct operations of, for example, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, process 1300 of FIG. 13, and/or other processes as described herein. In some aspects, executing instructions may include running the instructions, converting the instructions, compiling the instructions, and/or interpreting the instructions, among other examples.

In some aspects, the UE 120 includes means for establishing a PC5 unicast link with a second UE; and/or means for transmitting, to the second UE in a PC5 radio resource control (RRC) message, capability information that includes an indication that the UE is a UAV. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for transmitting the PC5 RRC message including the capability information to the second UE during establishment of the PC5 unicast link with the second UE.

In some aspects, the UE 120 includes means for receiving, from the second UE, a PC5 RRC UE capability information message that includes an indication of whether the second UE is a UAV.

In some aspects, the UE 120 includes means for transmitting the PC5 RRC UE capability information message to the second UE based at least in part on receiving a PC5 RRC UE capability enquiry message from the second UE.

In some aspects, the UE 120 includes means for transmitting, to the second UE, sidelink control information (SCI) relating to a PC5 unicast communication or a PC5 groupcast communication, wherein the SCI includes information relating to a height of the UE.

In some aspects, the UE 120 includes means for transmitting, to the second UE in a PC5 RRC master information block message, an indication of a UAV status that indicates whether the UE is on ground or in air.

In some aspects, the UE 120 includes means for receiving, from the second UE, a PC5 RRC reconfiguration message that includes a request for flying information; or means for transmitting, to the second UE and based at least in part on receiving the PC5 RRC reconfiguration message, a PC5 RRC reconfiguration complete message that includes a flying information for the UE, wherein the flying information includes at least one of a speed, direction, or elevation of the UE.

In some aspects, the UE 120 includes means for transmitting, to the second UE, a PC5 RRC measurement report message that includes a height report for the UE.

In some aspects, the UE 120 includes means for receiving, from a second UE in a PC5 RRC message, capability information that includes an indication that the second UE is a UAV; means for receiving, from the second UE, SCI associated with a sidelink communication from the second UE, wherein the SCI includes information relating to a height of the second UE; and/or means for selectively transmitting, to the second UE, hybrid automatic repeat request (HARQ) feedback for the sidelink communication based at least in part on a distance between the first UE and the second UE determined using the information relating to the height of the second UE. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for selectively transmitting, to the second UE, the HARQ feedback for the sidelink communication based at least in part on a determination of whether the distance between the first UE and the second UE is within the MCR associated with the second UE.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
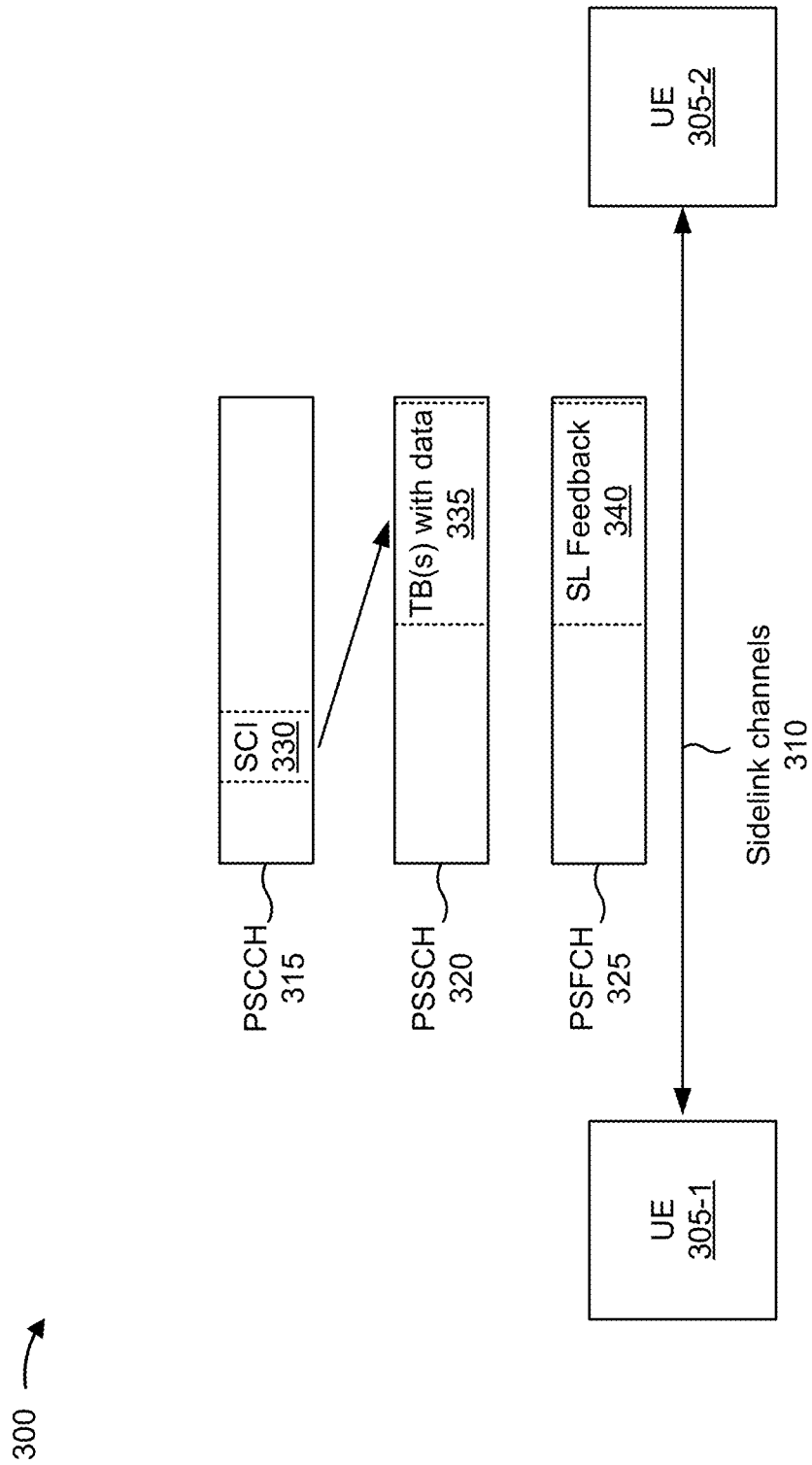
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305)

via one or more sidelink channels 310. The UEs 305-1 and 305-2 may communicate using the one or more sidelink channels 310 for P2P communications, D2D communications, V2X communications (e.g., which may include V2V communications, V2I communications, and/or vehicle-to-pedestrian (V2P) communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as HARQ feedback (e.g., acknowledgement or negative acknowledgement (ACK/NACK) information), transmit power control (TPC), and/or a scheduling request (SR).

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
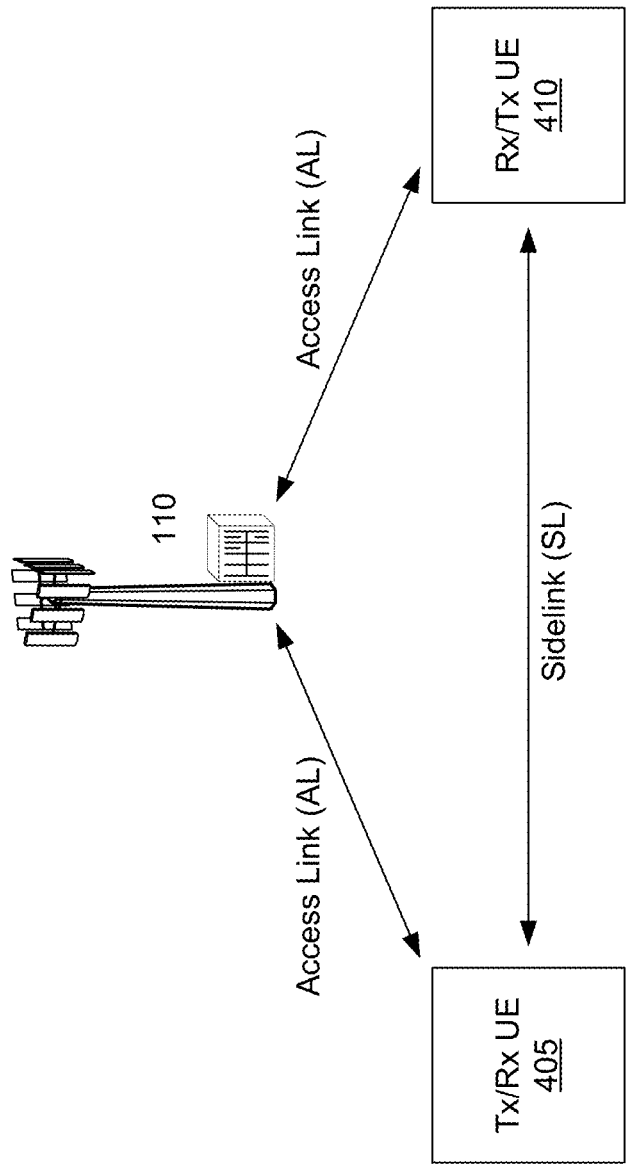
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
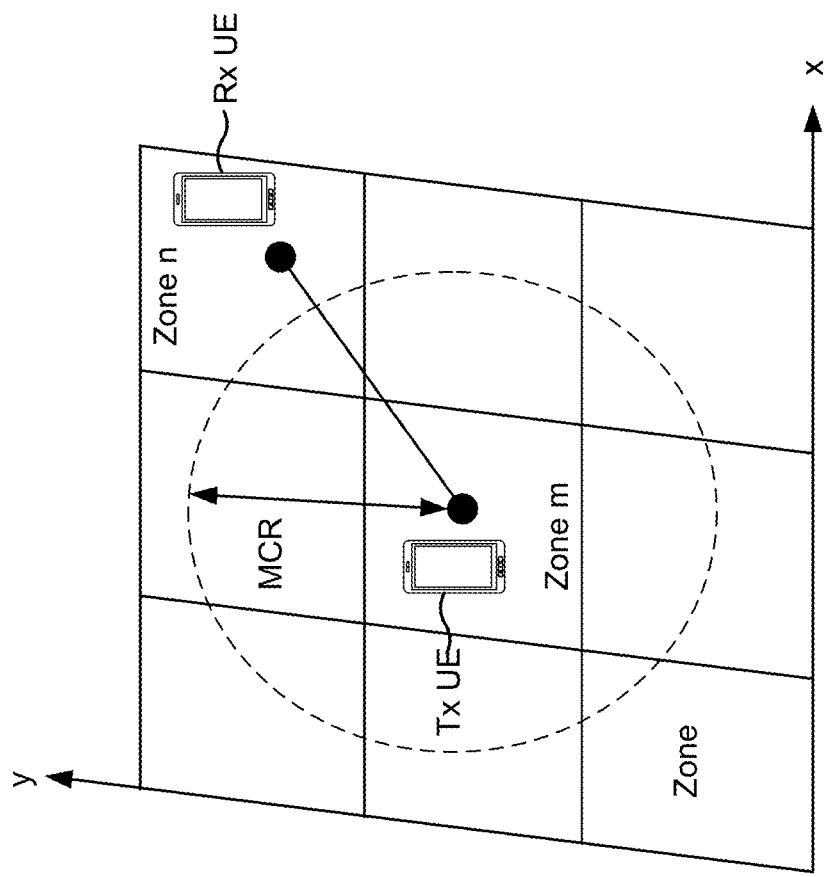
FIG. 5 is a diagram illustrating an example of vehicle-to-everything (V2X) distance-based feedback, in accordance with the present disclosure.

FIG. 5 is a diagram illustrating an example 500 of V2X distance-based feedback, in accordance with the present disclosure.

In NR V2X communications, a UE may transmit a sidelink communication (e.g., PSCCH communication, PSSCH communication, and/or PSFCH communication) via a broadcast to all other UEs within a range of the UE, via a groupcast to a group of UEs, or via a unicast to another UE. For groupcast and unicast sidelink communications, a PC5 RRC connection may be needed between a Tx UE and each Rx UE. PC5 refers to the PC5 interface, which is an interface for direct communication between UEs (e.g., sidelink communication). In NR, broadcast sidelink communications without HARQ feedback may be supported. HARQ ACK/NACK feedback may be supported for unicast sidelink communications. In some examples, distance-based HARQ feedback may be used for groupcast sidelink communications in NR V2X.

As shown in FIG. 5, example 500 includes a Tx UE and an Rx UE. The Tx UE may transmit a sidelink communication to the Rx UE over the PC5 interface. For example, the Tx UE may transmit a groupcast sidelink communication to the Rx UE and one or more other UEs. The Rx UE may determine whether to transmit HARQ feedback for the groupcast sidelink communication based at least in part on a distance between the Tx UE and the Rx UE. The Tx UE may broadcast, in SCI, a minimum communication range (MCR) associated with the Tx UE and a zone identifier (ID) corresponding to a present location of the Tx UE, and a zone size associated with the zone ID. For example, the Tx UE may transmit the SCI in a system information block (SIB-x). The MCR may be included in PC5 quality of service (QoS) rules. The MCR may be a range, within which the Rx UE transmits HARQ feedback. In some examples, range values for the MCR defined in the PC5 QoS rules may include {20, 50, 80, 100, 120, 150, 180, 200, 220, 250, 270, 300, 350, 370, 400, 450, 480, 500, 550, 600, 700, 1000} meters, with 8 spare values. The MCR associated with the Tx UE may be application dependent, and the application dependent MCR may be indicated in SCI format 2 (SCI-2) as an index that is associated with an MCR value in a 16 value subset of the above range values.

The Rx UE may calculate the distance between the Tx UE and the Rx UE based at least in part on the zone ID for the Tx UE, a zone size, and a location of the Rx UE. The zone ID for the Tx UE may be included in SCI-2 to provide a zone-based location of the Tx UE. In some examples, zones are squares with configured dimensions (e.g., dimensions configured from {5, 10, 20, 30, 40, 50} meters). As shown in FIG. 5, in example 500, the Tx UE is in zone m and the Rx UE is in zone n. The zone ID for a UE (e.g., the Tx UE) may be determined from the geographical longitude/latitude (GLL) of the UE. The Rx UE may calculate the distance between the Tx UE and the Rx UE based at least in part on the zone ID for the Tx UE and the location of the RX UE, and the RX UE may compare the distance between the Tx UE and the RX UE within the MCR. In some examples, the Rx UE may transmit HARQ feedback for the groupcast sidelink transmission based at least in part on a determination that the distance is less than or equal to the MCR. In some cases, distance-based feedback may be configured for NACK-only feedback to a groupcast sidelink communication. In this case, the Rx UE may be within the MCR associated with the Tx UE, and may send HARQ NACK feedback if PSSCH decoding fails, but the Rx UE may not send HARQ ACK feedback if PSSCH decoding is successful.

As indicated above, FIG. 5 is provided as an example. Other examples may differ from what is described with respect to FIG. 5.

Figure 6:
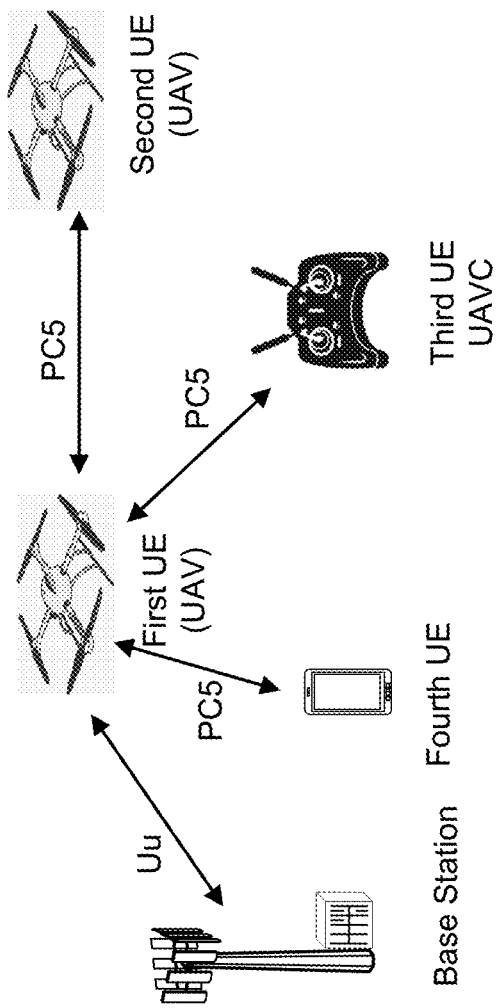
FIG. 6 is a diagram illustrating an example of unmanned aerial vehicles (UAVs) in a wireless network, in accordance with the present disclosure.

FIG. 6 is a diagram illustrating an example 600 of UAVs in a wireless network, in accordance with the present disclosure. As shown in FIG. 6, example 600 includes a base station, a first UE, a second UE, a third UE, and a fourth UE. The first UE and the second UE are UAVs. The third is a UAV controller (UAVC) that may control one or more UAVs (e.g., the first UE and/or the second UE). The fourth UE is a non-UAV UE (e.g., a terrestrial UE), such as a cellular phone (e.g., a smartphone), a wireless communication device, a vehicular component, or any other non-UAV UE.

As shown in FIG. 6, a UAV (e.g., the first UE) may communicate with the base station via the Uu interface. For example, the UAV may transmit uplink communications to the base station and/or receive downlink communications from the base station via the Uu interface. Such Uu connectivity may be used to support different applications for the UAV, such as video transmission from the UAV or remote command and control of the UAV, among other examples.

As further shown in FIG. 6, a UAV (e.g., the first UE) may be capable of communicating via the PC5 interface with other UAVs (e.g., the second UE), one or more UAVCs (e.g., the third UE), and other non-UAV UEs (e.g., the fourth UE). For example, PC5 communications (e.g., sidelink communications) between UAVs (e.g., the first UE and the second UE) may be used by UAVs to detect and avoid other UEs while in flight in order to prevent collisions between UAVs. This may result in decreased latency in communications between the UAVs, as compared with the UAVs communicating via transmissions to and from the base station. PC5 communications between a UAV (e.g., the first UAV) and a UAVC (e.g., the third UE) may be used for remote command and control of the UAV. In this case, PC5 communications may result in increased range of the command and control communications. PC5 communications between a UAV (e.g., the first UE) and non-UAV UEs (e.g., the fourth UE) may be used, for example, to broadcast a remote ID associated with the UAV to the non-UAV UEs. However, NR, in the specification promulgated by 3GPP, does not support PC5 communications for UAVs.

In some cases, it may be possible for UAVs to communicate with each other and/or other UEs using NR V2X communications. However, NR V2X may not adequately support PC5 communications involving UAVs, and treating UAVs as V2X UEs may result in increased latency and unreliable PC5 communications. For example, a UAV in flight may be located at a certain height (e.g., 1.5-300 m) above the ground. In this case, for V2X distance-based feedback, as described above in connection with FIG. 5, the zone-based distance calculations by the UAV or another UE receiving a transmission from the UAV may be inaccurate, leading to decreased reliability of PC5 communications and increased latency of sidelink traffic.

Some techniques and apparatuses described herein enable NR operation for UAV-to-everything (U2X) PC communications. In some aspects, a UAV UE may establish a PC5 unicast link with another UE (e.g., another UAV UE or a non-UAV UE). The UAV UE may transmit, to the other UE in a PC5 RRC message, capability information that includes an indication of a UAV UE type. In some aspects, the UAV UE may transmit, to the other UE, one or more other PC5 RRC messages and/or SCI that include UAV information, such as height information associated with the UAV UE. In some aspects, the other UE may determine whether to transmit HARQ feedback for a sidelink communication transmitted by the UAV UE based at least in part on a three-dimensional (3D) distance determined using the height information. As a result, reliability of PC5 communications involving UAVs may be increased and latency of PC5 communications involving UAVs may be decreased, as compared to using V2X sidelink communications for UAVs.

As indicated above, FIG. 6 is provided as an example. Other examples may differ from what is described with respect to FIG. 6.

Figure 7:
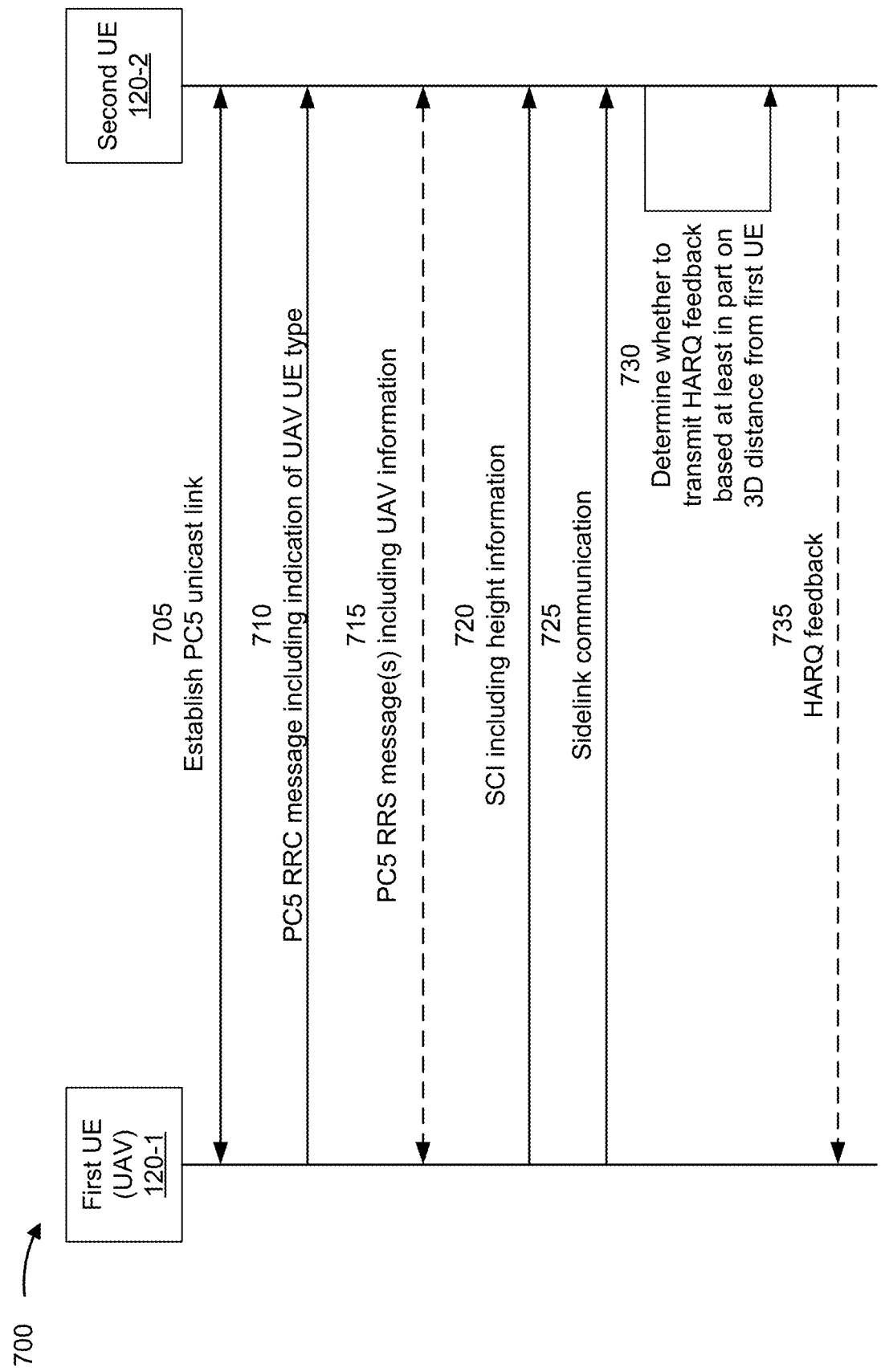
FIGS. 7-11 are diagrams illustrating examples associated with messaging for UAV sidelink communications, in accordance with the present disclosure.

FIG. 7 is a diagram illustrating an example 700 associated with messaging for UAV sidelink communications, in accordance with the present disclosure. As shown in FIG. 7, example 700 includes communication between a first UE 120-1 and a second UE 120-2 (collectively referred to as UEs 120). In some aspects, the UEs 120 may be included in a wireless network, such as wireless network 100. The UEs 120 may communicate via one or more sidelink channels (e.g., via the PC5 interface). In example 700, the first UE 120-1 may be a UAV, and the second UE 120-2 may be UAV or a non-UAV UE (e.g., a UAVC or another non-UAV UE).

As shown in FIG. 7, and by reference number 705, the first UE 120-1 may establish a PC5 unicast link with the second UE 120-2. The PC5 unicast link may be an RRC connection between the first UE 120-1 and the second UE 120-2 on the PC5 interface. The PC5 interface is an interface for direct communication (e.g., sidelink communication) between UEs. An initiating UE (e.g., the first UE 120-1 or the second UE 120-2) may transmit, to the other UE, a direct communication request. In some aspects, the first UE 120-1 may be the initiating UE, and in some aspects, the second UE 120-2 may be the initiating UE. The UEs 120 may exchange PC5 security (PC5-S) messages to perform security procedures associated with establishing security for the unicast link.

The first UE 120-1 and the second UE 120-2 may then exchange PC5 RRC messages to configure the PC5 RRC connection between the first UE 120-1 and the second UE 120-2. For example, the first UE 120-1 and the second UE 120-2 may use PC5 RRC signaling to exchange UE capabilities and access stratum (AS) layer configurations, such as Sidelink Data Radio Bearer (DRB) configurations, for the UEs 120.

As further shown in FIG. 7, and by reference number 710, the first UE 120-1 may transmit, to the second UE 120-2, a PC5 RRC message that includes an indication of a UAV UE type. As used herein, a PC5 RRC message refers to an RRC message transmitted over the PC5 interface. In some aspects, the first UE 120-1 may transmit, in the PC5 RRC message, UE capability information that includes an indication that the first UE 120-1 is a UAV. For example, the capability information may include a field for indicating a UE type, and the first UE 120-1 may set the field to a value associated with a UAV UE type.

In some aspects, the first UE 120-1 may transmit the PC5 RRC message that includes the indication of the UAV UE type during the establishment of the unicast link between the first UE 120-1 and the second UE 120-2. For example, the first UE 120-1 may include, in a PC5 RRC message transmitted in the exchange of UE capabilities during the establishment of the unicast link, the UE capability information that includes the indication of the UAV UE type. In some aspects, the first UE 120-1 may transmit the indication of the UAV UE type to the second UE 120-2 in capability information included in a PC5 RRC capability enquiry message (e.g., UECapabilityEnquirySidelink). In some aspects, the first UE 120-1 may transmit the indication of the UAV UE type to the second UE 120-2 in a PC5 RRC capability information message (e.g., UECapabilityInformationSidelink). In some aspects, the first UE 120-1 may transmit the PC5 message that includes the indication of the UAV UE type after establishment of the unicast link.

As further shown in FIG. 7, and by reference number 715, in some aspects, the first UE 120-1 may transmit, to the second UE 120-2, and/or receive, from the second UE 120-2, one or more other PC5 RRC messages including UAV information. For example, the one or more other PC5 RRC messages including the UAV information may be transmitted by the first UE 120-1 and/or the second UE 120-2 during establishment of the unicast link and/or after establishment of the unicast link.

In some aspects, the UAV information may include UAV information relating to the first UE 120-1, such as a UAV status (e.g., on ground or in air), height/elevation, and/or other flying information (e.g., speed and/or direction, among other examples) associated with the first UE 120-1. In some aspects, in a case in which the second UE 120-2 is a UAV, the UAV information may include UAV information relating to the second UE 120-2. In some aspects, the one or more PC5 RRC messages may include one or more requests, from the second UE 120-2, for UAV information relating to the first UE 120-1 and/or one or more requests, from the first UE 120-1, for UAV information relating to the second UE 120-2.

In some aspects, the one or more RRC messages may include one or more of a PC5 RRC master information block message (e.g., MasterInformationBlockSidelink), a PC5 RRC reconfiguration message (e.g., RRCReconfigurationSidelink), a PC5 RRC reconfiguration complete message (RRCReconfigurationCompleteSidelink), a PC5 RRC reconfiguration failure message (RRCReconfigurationFailureSidelink), and/or a PC5 measurement report message (e.g., MeasurementReportSidelink).

As further shown in FIG. 7, and by reference number 720, the first UE 120-1 may transmit SCI that includes information relating to a height of the first UE 120-1. As used herein, the height of a UAV (e.g., the first UE 120-1) may refer to an elevation of the UAV or a distance from the UAV to the ground. The second UE 120-2 may receive the SCI transmitted by the first UE 120-1. The SCI may be associated with a sidelink communication (e.g., a PSSCH communication) to be transmitted by the first UE 120-1. For example, the SCI may schedule resources for transmitting the sidelink communication. In some aspects, the sidelink communication may be a unicast sidelink communication to be transmitted from the first UE 120-1 to the second UE 120-2. In some aspects, the sidelink communication may be a groupcast sidelink communication to be transmitted from the first UE 120-1 to the second UE 120-2 and one or more other UEs in a group of UEs.

In some aspects, the first UE 120-1 may broadcast the SCI. For example, the first UE 120-1 may broadcast the SCI in an SIB-x. In some aspects, the first UE 120-1 may transmit the SCI to the second UE 120-2 in a unicast or groupcast transmission. In some aspects, the SCI may include a 3D zone ID associated with a location of the first UE 120-1. In this case, 3D zones may be configured for UAV UEs, and the 3D zone ID may correspond to a 3D zone that corresponds to the current position of the first UE 120-1 in 3D space (e.g., latitude, longitude, and elevation). In some aspects, the SCI may also include an indication of a size of the 3D zone, which may include a separate indication a vertical size of the 3D zone in a case in which the vertical size of the 3D zone is not the same as the dimensions of a two-dimensional (2D) zone for non-UAV UEs.

In some aspects, the SCI may include an indication of a 2D zone associated with a current location of the first UE 120-1 and an indication of the current height or a vertical zone ID based on the current height of the first UE 120-1. For example, the 2D zone ID may be associated with a 2D zone for a location on the ground directly below the first UE 120-1. In some aspects, the SCI may also include an MCR associated with the first UE 120-1. Alternatively, the SCI may include an MCR configured for a 2D distance range and an indication of a range in the vertical dimension. The range in the vertical dimension may be configured to control the relative height between the Tx UE (e.g. the first UE 120-1 and Rx UE (e.g., the second UE 120-2) for the HARQ feedback. For example, only the Rx UE(s) with the 2D distance within the MCR range and the relative height within the height range may send HARQ feedback to the Tx UE.

As further shown in FIG. 7, and by reference number 725, the first UE 120-1 may transmit the sidelink communication associated with (e.g., scheduled by) the SCI. For example, the sidelink communication may be a PSSCH communication. In some aspects, the first UE 120-1 may groupcast the sidelink communication to the second UE 120-2 and one or more other UEs in a group of UEs. In some aspects, the first UE 120-1 may unicast the sidelink communication to the second UE 120-2.

As further shown in FIG. 7, and by reference number 730, the second UE 120-2 may determine whether to transmit HARQ feedback for the sidelink communication based at least in part on a 3D distance between the first UE 120-1 and the second UE 120-2. In some aspects, the second UE 120-2 may use the 3D distance for determining whether to transmit the HARQ feedback based at least in part on the indication that the first UE 120-1 is a UAV received in the PC5 RRC message and/or an indication of UAV status (e.g., on ground or in air) for the first UE 120-1 received in another PC5 RRC message.

The second UE 120-2 may determine the distance between the first UE 120-1 and the second UE 120-2 using the information relating to the height of the first UE 120-1 that is included in the SCI transmitted by the first UE 120-1. In some aspects, the second UE 120-2 may determine the distance between the first UE 120-1 and the second UE 120-2 based at least in part on the current location of the second UE 120-2, the 3D zone ID for the first UE 120-1, and the zone size of the 3D zone associated with the 3D zone ID for the first UE 120-1. In some aspects, the second UE 120-2 may determine the distance between the first UE 120-1 and the second UE 120-2 based at least in part on the current location of the second UE 120-2, the 2D zone ID (and 2D zone size) for the first UE 120-1, and the height of the first UE 120-1 indicated in the SCI.

In some aspects, in a case in which the second UE 120-2 is a UAV, the second UE 120-2 may determine the 3D distance between the first UE 120-1 and the second UE 120-2 based at least in part on a current location in 3D space (e.g., longitude, latitude, and elevation) of the second UE 120-2. For example, the second UE 120-2 may determine the 3D distance between the first UE 120-1 and the second UE 120-2 based at least in part on a difference between a current height of the second UE 120-2 and the height of the first UE 120-1 indicated in the SCI.

The second UE 120-2 may determine whether to transmit the HARQ feedback for the sidelink communication based at least in part on comparing the distance between the first UE 120-1 and the second UE 120-2 with the MCR associated with the first UE 120-1. The second UE 120-2 may determine to transmit the HARQ feedback based at least in part on a determination that the second UE 120-2 is within the MCR associated with the first UE 120-1 (e.g., the 3D distance between the first UE 120-1 and the second UE 120-2 is less than or equal to the MCR). The second UE 120-2 may determine not to transmit the HARQ feedback based at least in part on a determination that the second UE 120-2 is not within the MCR associated with the first UE 120-1 (e.g., the 3D distance between the first UE 120-1 and the second UE 120-2 is greater than (or greater than or equal to) the MCR).

As further shown in FIG. 7, and by reference number 735, the second UE 120-2 may selectively transmit, to the first UE 120-1, the HARQ feedback for the sidelink communication based at least in part on the 3D distance-based determination of whether to transmit the HARQ feedback. The second UE 120-2 may transmit the HARQ feedback to the first UE 120-1 based at least in part on a determination that the second UE 120-2 is within the MCR associated with the first UE 120-1. The second UE 120-2 may not transmit the HARQ feedback based at least in part on a determination that the second UE 120-2 is not within the MCR associated with the first UE 120-1.

In some aspects, the 3D distance-based determination may be used only to determine whether to transmit HARQ-NACK feedback (e.g., for a groupcast sidelink communication). In this case, the second UE 120-2 may perform the 3D distance-based determination based at least in part on a failure by the second UE 120-2 to decode the sidelink communication (e.g., groupcast sidelink communication) transmitted by the first UE 120-1, and the second UE 120-2 may transit the HARQ-NACK to the first UE 120-1 based at least in part on the determination that the second UE 120-2 is within the MCR associated with the first UE 120-1.

In some aspects, the 3D distance-based determination may be used for HARQ-ACK feedback, as well as HARQ-NACK feedback. In this case, the second UE 120-2 may transmit the HARQ-ACK to the first UE 120-1 based at least in part on successfully decoding the sidelink communication and based at least in part on the determination that the second UE 120-2 is within the MCR associated with the first UE 120-1. The second UE 120-2 may transmit the HARQ-NACK to the first UE 120-1 based at least in part on a failure to decode the sidelink communication and based at least in part on the determination that the second UE 120-2 is within the MCR associated with the first UE 120-1.

As described above in connection with FIG. 7, a UAV UE (e.g., the first UE 120-1) may establish a PC5 unicast link with another UE (e.g., the second UE 120-2). The UAV UE may transmit, to the other UE in a PC5 RRC message, capability information that includes an indication of a UAV UE type. The UAV UE may transmit, to the other UE, one or more other PC5 RRC messages that include UAV information. The UAV UE may transmit SCI that includes information relating to a height of the UAV UE. The other UE may determine whether to transmit HARQ feedback for a sidelink communication transmitted by the UAV UE based at least in part on a three-dimensional (3D) distance between the UEs determined using the information relating to the height of the UAV UE. As a result, reliability of PC5 communications involving UAVs may be increased and latency of PC5 communications involving UAVs may be decreased, as compared to using V2X sidelink communications for UAVs As indicated above, FIG. 7 is provided as an example. Other examples may differ from what is described with respect to FIG. 7.

Figure 8:
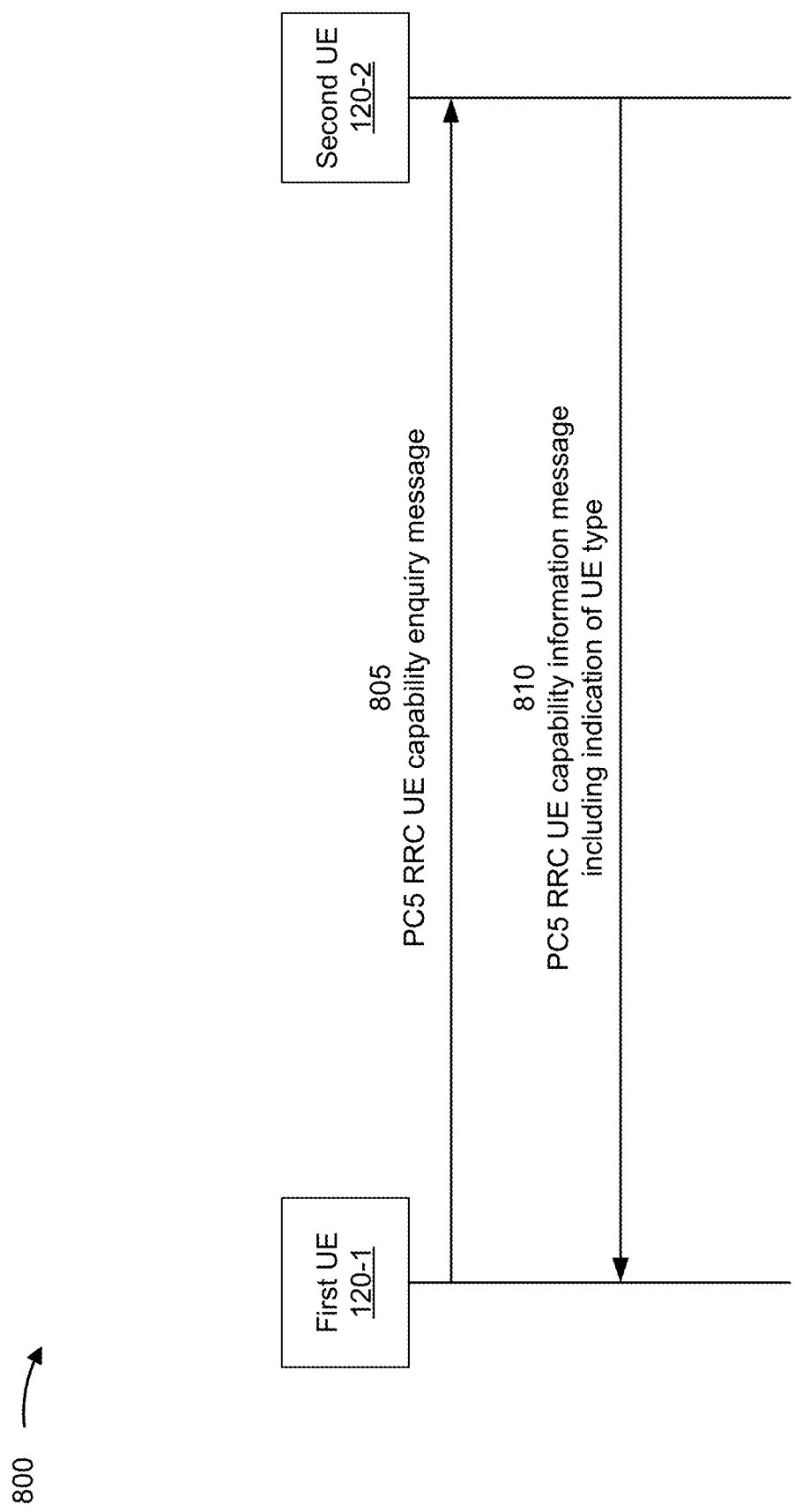

FIG. 8 is a diagram illustrating an example 800 associated with messaging for UAV sidelink communication, in accordance with the present disclosure. As shown in FIG. 8, example 800 includes communication between a first UE 120-1 and a second UE 120-2 (collectively referred to as UEs 120). In some aspects, the UEs 120 may be included in a wireless network, such as wireless network 100. The UEs 120 may communicate via one or more sidelink channels (e.g., via the PC5 interface). In example 800, the first UE 120-1 may be a UAV or a non-UAV UE (e.g., a UAVC or another non-UAV UE), and the second UE 120-2 may be UAV or a non-UAV UE (e.g., a UAVC or another non-UAV UE).

As shown in FIG. 8, and by reference number 805, the first UE 120-1 may transmit, to the second UE 120-2, a PC5 RRC UE capability enquiry message. The first UE 120-1 may transmit the PC5 RRC UE capability enquiry message (e.g., UECapabilityEnwuirySidelink) to request an exchange of UE sidelink capabilities with the second UE 120-2. The PC5 RRC UE capability enquiry message may include an RRC transaction ID (e.g., rrc-TransactionIdentifier) and a list of frequency bands (e.g., frequencyBandListFilterSidelink) for which the second UE 120-2 is requested to provide supported bands and band combinations. In some aspects, such as in a case in which the first UE 120-1 is a UAV, the list of frequency bands may include a dedicated UAV spectrum (e.g., a dedicated spectrum for UAV PC5 communications).

In some aspects, the PC5 RRC UE capability enquiry message may include capability information (e.g., ue-CapabilityInformationSidelink) associated with the first UE 120-1. In this case, the capability information may include a field for indicating a UE type of the first UE 120-1. For example, the first UE 120-1 may indicate whether the first UE 120-1 is a UAV UE type or a non-UAV UE type in the capability information. In this case, the non-UAV UE type may include terrestrial UEs with PC5 capabilities and UAVC UEs. In some aspects, the capability information may include an indication of an AS release supported by the first UE 120-1. For example, the indication of the AS release may indicate, to a UAV UE, whether a non-UAV UE supports U2X PC5 communications with the UAV UE.

As further shown in FIG. 8, and by reference number 810, the second UE 120-2 may transmit, to the first UE 120-1, a PC5 RRC capability information message that includes an indication of the UE type for the second UE 120-2. The second UE 120-2 may transmit the PC5 RRC capability information message (e.g., UECapabilityInformationSidelink) to the first UE 120-1 based at least in part on receiving the PC5 RRC UE capability enquiry message. The PC5 RRC capability information message may include a field for indicating a UE type of the second UE 120-2. For example, the second UE 120-2 may indicate whether the second UE 120-2 is a UAV UE type or a non-UAV UE type in the UE type field.

The PC5 RRC capability information message may also include an indication of the AS release supported by the second UE 120-2 (e.g., accessStratumReleaseSidelink), an indication of packet data convergence protocol (PDCP) parameters (e.g., pdcp-ParametersSidelink), an indication of radio link control (RLC) parameters (e.g., rlc-ParametersSidelink), and a list of supported frequency band combinations (e.g., supportedBandCombinationListSidelink) from the list of frequency bands included in the PC5 RRC UE capability enquiry message. In some aspects, in a case in which the second UE 120-2 is a UAV, the second UE 120-2 may include, in the list of supported frequency band combinations, a dedicated UAV spectrum. In some aspects, the second UE 120-2 may include the dedicated UAV spectrum in the list of supported frequency band combinations in a case in which the second UE 120-2 is a UAV and the second UE 120-2 is higher than a threshold height off the ground.

As indicated above, FIG. 8 is provided as an example. Other examples may differ from what is described with respect to FIG. 8.

Figure 9:
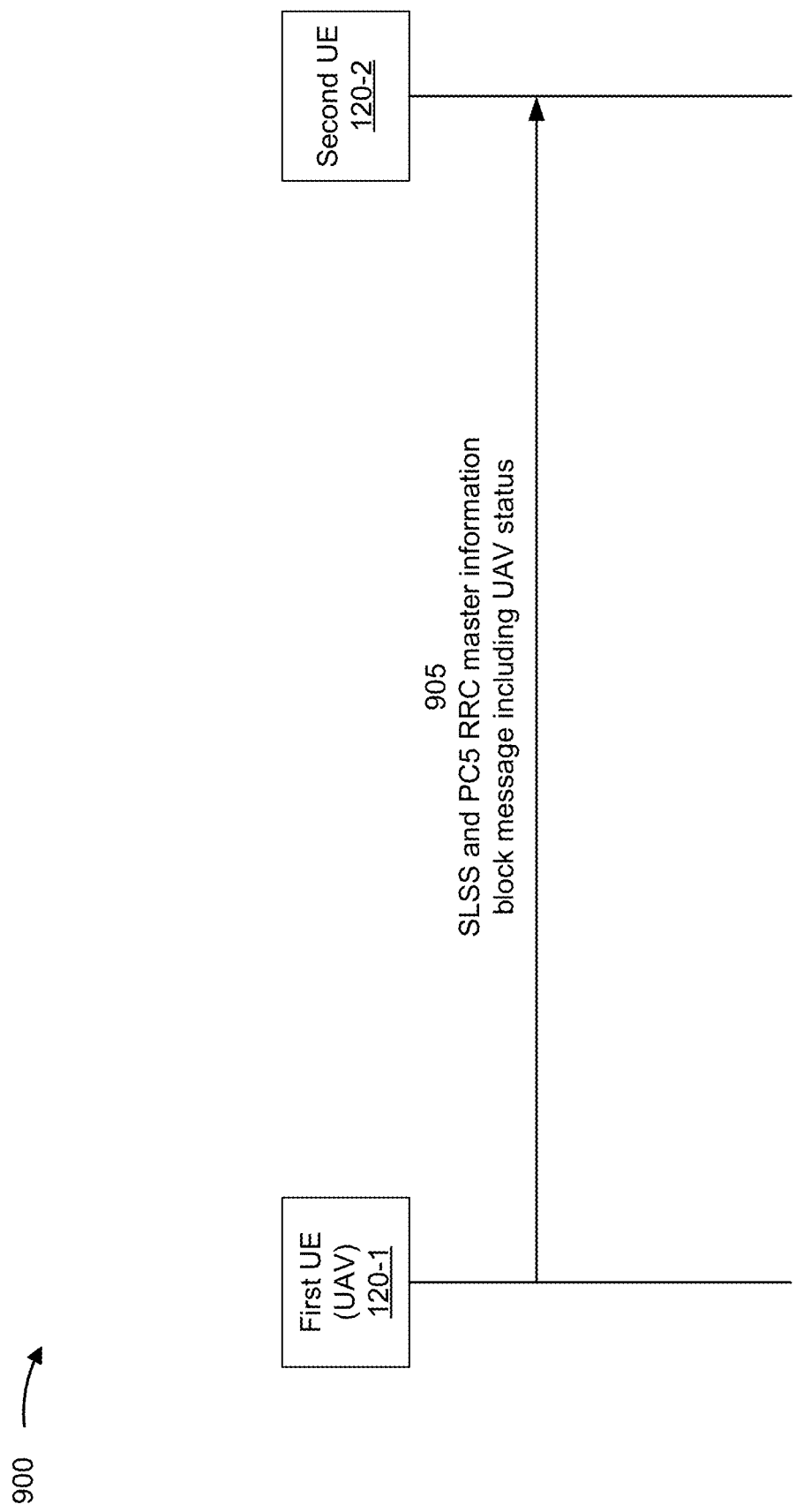

FIG. 9 is a diagram illustrating an example 900 associated with messaging for UAV sidelink communication, in accordance with the present disclosure. As shown in FIG. 9, example 900 includes communication between a first UE 120-1 and a second UE 120-2 (collectively referred to as UEs 120). In some aspects, the UEs 120 may be included in a wireless network, such as wireless network 100. The UEs 120 may communicate via one or more sidelink channels (e.g., via the PC5 interface). In example 900, the first UE 120-1 may be a UAV, and the second UE 120-2 may be UAV or a non-UAV UE (e.g., a UAVC or another non-UAV UE).

As shown in FIG. 9, and by reference number 905, the first UE 120-1 may transmit, to the second UE 120-2, a sidelink synchronization signal (SLSS) and a PC5 RRC master information block message including an indication of a UAV status of the first UE 120-1. The RRC master information block message may provide synchronization information to the second UE 120-2. The RRC master information block message may include an indication of a time division duplex (TDD) configuration being used by the first UE 120-1, indications of a frame number and a slot number for a synchronization signal block (SSB), and an in coverage indicator that indicates whether the first UE 120-1 is in a coverage area of a base station.

The PC5 RRC master information block message may include a field for the indication of the UAV status. For example, the first UE 120-1 may include in the UAV status field an indication of whether the first UE 120-1 is in the air (e.g., above a threshold height) or on the ground. In some aspects, in a case, in which the UAV status for the first UE 120-1 indicates that the first UE 120-1 is on the ground, the second UE 120-2 may treat the first UE 120-1 like a non-UAV UE. In some aspects, the second UE 120-2 may perform 3D distance based HARQ feedback for sidelink transmissions from the first UE 120-1 based at least in part on the UAV status for the first UE 120-1 indicating that the first UE 120-1 is in the air. In some aspects, the second UE 120-2 may request flight information or a height report from the first UE 120-1 based at least in part on the UAV status for the first UE 120-1 indicating that the first UE 120-1 is in the air. In some aspects, such as in a case in which the second UE 120-2 is a UAV, the second UE 120-2 may communicate with the first UE 120-1 on a dedicated UAV spectrum based at least in part on the UAV status for the first UE 120-1 indicating that the first UE 120-1 is in the air.

In some aspects, the PC5 RRC master information block message may be a MasterInformationBlockSidelink message with the UAV status field added. In some aspects, the PC5 RRC master information block message may be a PC5 RRC master information block message defined for UAV UEs (e.g., MasterInformationBlockSidelink-Uav).

As indicated above, FIG. 9 is provided as an example. Other examples may differ from what is described with respect to FIG. 9.

Figure 10:
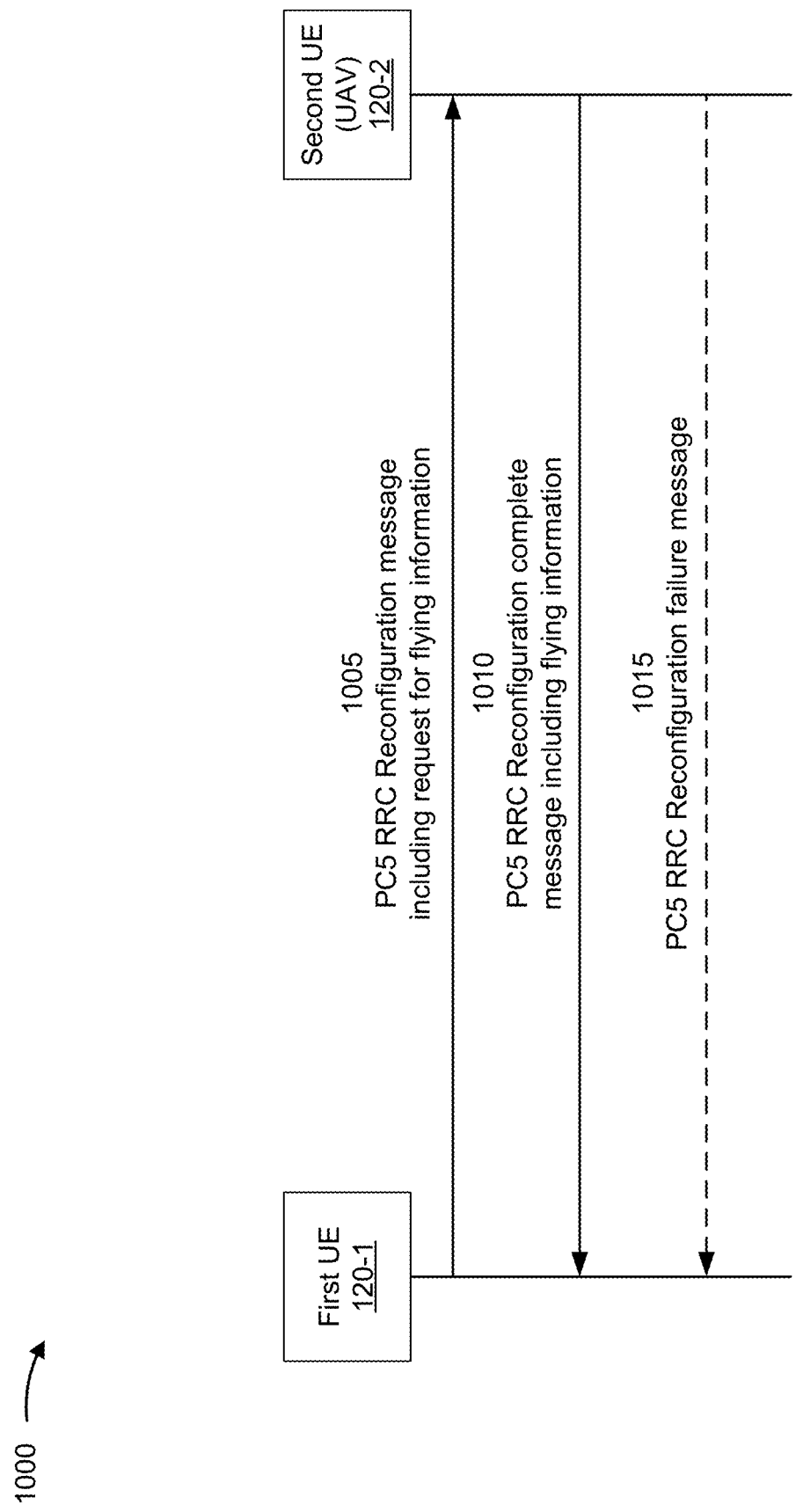

FIG. 10 is a diagram illustrating an example 1000 associated with messaging for UAV sidelink communication, in accordance with the present disclosure. As shown in FIG. 10, example 1000 includes communication between a first UE 120-1 and a second UE 120-2 (collectively referred to as UEs 120). In some aspects, the UEs 120 may be included in a wireless network, such as wireless network 100. The UEs 120 may communicate via one or more sidelink channels (e.g., via the PC5 interface). In example 1000, the first UE 120-1 may be a UAV or a non-UAV UE (e.g., a UAVC or another non-UAV UE), and the second UE 120-2 may be UAV.

As shown in FIG. 10, and by reference number 1005, the first UE 120-1 may transmit, to the second UE 120-2, a PC5 RRC reconfiguration message including a request for flying information associated with the second UE 120-2. In some aspects, the first UE 120-1 may transmit the PC5 RRC reconfiguration message including the request for the flying information based at least in part on receiving an indication (e.g., in an RRC compatibility information message) that the second UE 120-2 is a UAV UE type and/or based at least in part on receiving an indication (e.g., in a PC5 RRC master information block message) that the second UE 120-2 is in the air. The PC5 RRC reconfiguration message (e.g., RRCReconfigurationSidelink) may be used to establish, modify or release sidelink DRBs or to configure NR sidelink measurement reports between the UEs 120.

The PC5 RRC reconfiguration message may include configuration information (e.g., RRCReconfigurationSidelink-IEs) for configuring frequency resources and measurement channel state information reference signals (CSI-RSs), among other examples. In some aspects, the configuration information in the PC5 RRC reconfiguration message may also include a field for indicating a flying information request. The flying information request may request flying information, such as speed, direction of travel, height/elevation, vertical velocity, and/or horizontal velocity, among other examples. In some aspects, the field for indicating the flying information request may be added to RRCReconfigurationSidelink-IEs. In some aspects, the PC5 RRC reconfiguration message may include a set of configuration information defined for UAV UEs (e.g., RRCReconfigurationSidelink-Uav-IEs) that includes the field for indicating the request for flying information.

As further shown in FIG. 10, and by reference number 1010, the second UE 120-2 may transmit, to the first UE 120-1 a PC5 RRC reconfiguration complete message. The second UE 120-2 may transmit the PC5 RRC reconfiguration complete message (e.g., RRCReconfigurationCompleteSidelink) to the first UE 120-1 based at least in part on receiving the PC5 RRC reconfiguration message. In some aspects, based at least in part on the request for the flying information in the PC5 RRC reconfiguration message, the second UE 120-2 may include flying information for the second UE 120-2 in the PC5 RRC reconfiguration complete message. For example, the flying information may include speed, direction of travel, height/elevation, vertical velocity, and/or horizontal velocity of the second UE 120-2, among other examples. In some aspects, a set of configuration information (e.g., RRCReconfigurationCompleteSidelink-IEs) in the PC5 RRC reconfiguration message may include a flying information report field for indicating the flying information.

The first UE 120-1 may receive the PC5 RRC configuration complete message that includes the flying information for the second UE 120-2. In some aspects, the first UE 120-1 may adjust a Tx/Rx beam for PC5 communications with the second UE 120-2 based at least in part on the flying information for the second UE 120-2. In some aspects, such as in a case in which the first UE 120-1 is also a UAV, the first UE 120-1 may adjust a speed, height, and/or direction of flight based at least in part on the flying information for the second UE 120-2, for example, to avoid a collision with the second UE 120-2.

As further shown in FIG. 10, and by reference number 1015, in a case in which the RRC reconfiguration fails, the second UE 120-2 may transmit, to the first UE 120-1, a PC5 RRC reconfiguration failure message (e.g., RRCReconfigurationFailureSidelink). In some aspects, the second UE 120-2 may transmit the flying information to the first UE 120-1 in the PC5 RRC reconfiguration failure message, even in a case in which the RRC reconfiguration fails.

As indicated above, FIG. 10 is provided as an example. Other examples may differ from what is described with respect to FIG. 10.

Figure 11:
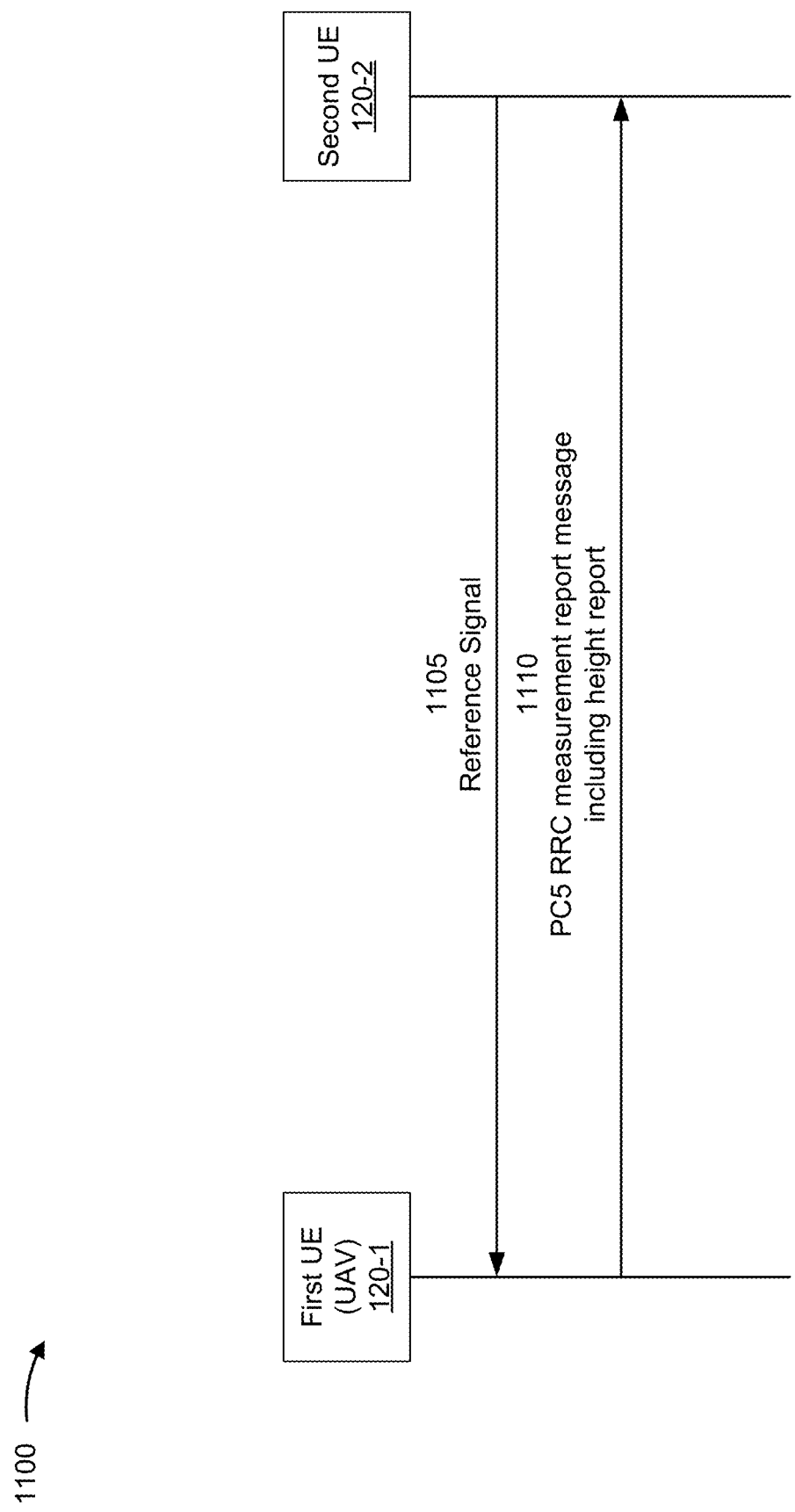

FIG. 11 is a diagram illustrating an example 1100 associated with messaging for UAV sidelink communication, in accordance with the present disclosure. As shown in FIG. 11, example 1100 includes communication between a first UE 120-1 and a second UE 120-2 (collectively referred to as UEs 120). In some aspects, the UEs 120 may be included in a wireless network, such as wireless network 100. The UEs 120 may communicate via one or more sidelink channels (e.g., via the PC5 interface). In example 1100, the first UE 120-1 may be a UAV, and the second UE 120-2 may be UAV or a non-UAV UE (e.g., a UAVC or another non-UAV UE).

As shown in FIG. 11, and by reference number 1105, the second UE 120-2 may transmit, to the first UE 120-1, a reference signal associated with a sidelink measurement to be performed by the first UE 120-1. For example, the reference signal may be a CSI-RS.

As further shown in FIG. 11, and by reference number 1110, the first UE 120-1 may transmit, to the second UE 120-2, a PC5 RRC measurement report message that includes a height report for the first UE 120-1. The first UE 120-1 may perform sidelink measurements, such as a DMRS measurement and an RSRP measurement, on the reference signal. The first UE 120-1 may also determine a current height of the first UE 120-1. The PC5 measurement report message (e.g., MeasurementReportSidelink) may include measurement information (e.g., MeasurementReportSidelink-IE) including a measurement ID, a DMRS measurement result, and an RSRP measurement result. In some aspects, the measurement information in the PC5 measurement report message may also include a field for indicating the height report. In some aspects, the height report may include a height relative to the ground and/or an elevation of the first UE 120-1. Additionally, or alternatively, in a case in which the first UE 120-1 and the second UE 120-2 are both UAVs, the height report may include a height of the first UE 120-1 relative to the second UE 120-2 (e.g., the UE that sent the reference signal for measurement).

In some aspects, the PC5 RRC measurement report message may also include a location report for the first UE 120-1. For example, the location report may include an indication of a current location. The location report may also include a current speed, direction of travel, horizontal velocity, and/or vertical velocity of the first UE 120-1. In some aspects, the location report may include a 3D zone ID for the first UE 120-1. In some aspects, the location report may include a 2D zone ID and the current height or a vertical zone ID based on the current height of the first UE 120-1. In some aspects, fields for the height report and/or the location report may be added to MeasurementReportSidelink-IE. In some aspects, a measurement information set that includes fields for the height report and/or location report (e.g., MeasurementReportSidelink-Uav-IE) may be defined for UAV UEs.

The second UE 120-2 may receive the PC5 RRC measurement report message that includes the height report and/or location report for the first UE 120-1. In some aspects, the second UE 120-2 may adjust a Tx/Rx beam for PC5 communications with the first UE 120-1 based at least in part on the height report and/or the location report for the first UE 120-1. In some aspects, such as in a case in which the second UE 120-2 is also a UAV, the second UE 120-2 may adjust a speed, height, and/or direction of flight based at least in part on the height report and/or location report for the first UE 120-1, for example, to avoid a collision with the first UE 120-1. In some aspects, the second UE 120-2 may be configured to periodically transmit the reference signal to the first UE 120-1. In this case, the second UE 120-2 may receive periodic updates to the height report and/or location report for first UE 120-1, and the second UE 120-2 may adjust beam directions and/or flight parameters based on the periodic updates to the height report and/or location report.

As indicated above, FIG. 11 is provided as an example. Other examples may differ from what is described with respect to FIG. 11.

Figure 12:
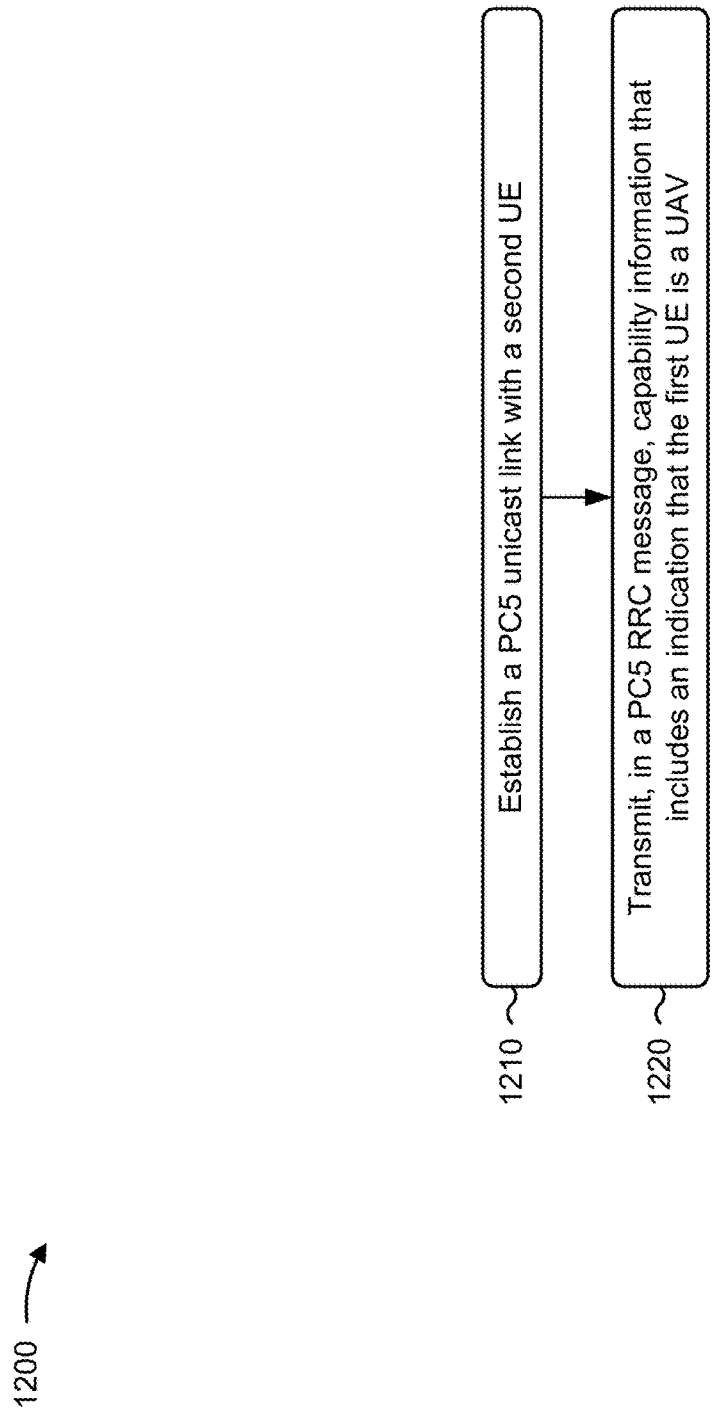
FIGS. 12-13 are diagrams illustrating example processes associated with messaging for UAV sidelink communications, in accordance with the present disclosure.

FIG. 12 is a diagram illustrating an example process 1200 performed, for example, by a first UE, in accordance with the present disclosure. Example process 1200 is an example where the UE (e.g., UE 120) performs operations associated with messaging for UAV sidelink communications.

As shown in FIG. 12, in some aspects, process 1200 may include establishing a PC5 unicast link with a second UE (block 1210). For example, the UE (e.g., using transmission component 1404 and/or reception component 1402, depicted in FIG. 14) may establish a PC5 unicast link with a second UE, as described above.

As further shown in FIG. 12, in some aspects, process 1200 may include transmitting, to the second UE in a PC5 RRC message, capability information that includes an indication that the first UE is a UAV (block 1220). For example, the UE (e.g., using transmission component 1404, depicted in FIG. 14) may transmit, to the second UE in a PC5 RRC message, capability information that includes an indication that the first UE is a UAV, as described above.

Process 1200 may include additional aspects, such as any single aspect or any combination of aspects described below and/or in connection with one or more other processes described elsewhere herein.

In a first aspect, transmitting the capability information includes transmitting the PC5 RRC message including the capability information to the second UE during establishment of the PC5 unicast link with the second UE.

In a second aspect, alone or in combination with the first aspect, the PC5 RRC message is a PC5 RRC UE capability enquiry message.

In a third aspect, alone or in combination with one or more of the first and second aspects, the PC5 RRC UE capability enquiry message includes, in a list of frequency bands, a dedicated UAV spectrum.

In a fourth aspect, alone or in combination with one or more of the first through third aspects, process 1200 includes receiving, from the second UE, a PC5 RRC UE capability information message that includes an indication of whether the second UE is a UAV.

In a fifth aspect, alone or in combination with one or more of the first through fourth aspects, the PC5 RRC UE capability information message further includes an indication of an access stratum release supported by the second UE.

In a sixth aspect, alone or in combination with the first aspect, the PC5 RRC message is a PC5 RRC UE capability information message, and transmitting the capability information comprises transmitting the PC5 RRC UE capability information message to the second UE based at least in part on receiving a PC5 RRC UE capability enquiry message from the second UE.

In a seventh aspect, alone or in combination with the sixth aspect, the PC5 RRC UE capability information message includes, in a list of supported frequency band combinations, a dedicated UAV spectrum.

In an eighth aspect, alone or in combination with one or more of the first through seventh aspects, process 1200 includes transmitting, to the second UE, SCI relating to a PC5 unicast communication or a PC5 groupcast communication, and the SCI includes information relating to a height of the first UE.

In a ninth aspect, alone or in combination with one or more of the first through eighth aspects, the SCI includes a 3D zone identifier associated with a location of the first UE.

In a tenth aspect, alone or in combination with one or more of the first through eighth aspects, the SCI includes a 2D zone identifier associated with a location of the first UE and an indication of the height of the first UE.

In an eleventh aspect, alone or in combination with one or more of the first through tenth aspects, process 1200 includes transmitting, to the second UE in a PC5 RRC master information block message, an indication of a UAV status that indicates whether the first UE is on ground or in air.

In a twelfth aspect, alone or in combination with one or more of the first through eleventh aspects, process 1200 includes receiving, from the second UE, a PC5 RRC reconfiguration message that includes a request for flying information, and transmitting, to the second UE and based at least in part on receiving the PC5 RRC reconfiguration message, a PC5 RRC reconfiguration complete message that includes a flying information for the first UE, and the flying information includes at least one of a speed, direction, or elevation of the first UE.

In a thirteenth aspect, alone or in combination with one or more of the first through twelfth aspects, process 1200 includes transmitting, to the second UE, a PC5 RRC measurement report message that includes a height report for the first UE.

In a fourteenth aspect, alone or in combination with one or more of the first through thirteenth aspects, the height report includes an indication of a height of the first UE relative to a ground.

In a fifteenth aspect, alone or in combination with one or more of the first through thirteenth aspects, the height report includes an indication of a height of the first UE relative to the second UE.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
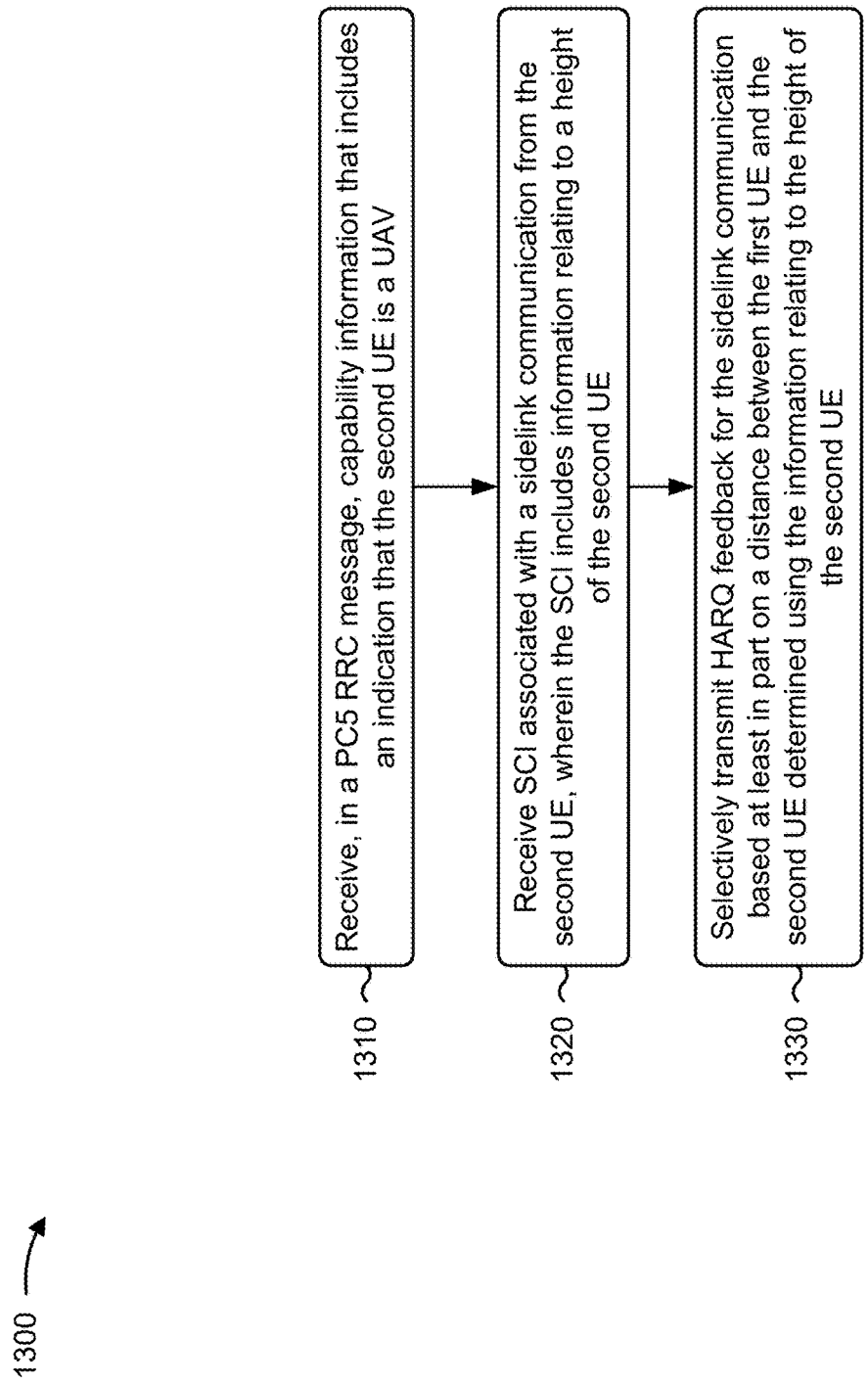

FIG. 13 is a diagram illustrating an example process 1300 performed, for example, by a first UE, in accordance with the present disclosure. Example process 1300 is an example where the UE (e.g., UE 120) performs operations associated with messaging for UAV sidelink communications.

As shown in FIG. 13, in some aspects, process 1300 may include receiving, from a second UE in a PC5 RRC message, capability information that includes an indication that the second UE is a UAV (block 1310). For example, the UE (e.g., using reception component 1402, depicted in FIG. 14) may receive, from a second UE in a PC5 RRC message, capability information that includes an indication that the second UE is a UAV, as described above.

As further shown in FIG. 13, in some aspects, process 1300 may include receiving, from the second UE, SCI associated with a sidelink communication from the second UE, wherein the SCI includes information relating to a height of the second UE (block 1320). For example, the UE (e.g., using reception component 1402, depicted in FIG. 14) may receive, from the second UE, SCI associated with a sidelink communication from the second UE, wherein the SCI includes information relating to a height of the second UE, as described above.

As further shown in FIG. 13, in some aspects, process 1300 may include selectively transmitting, to the second UE, HARQ feedback for the sidelink communication based at least in part on a distance between the first UE and the second UE determined using the information relating to the height of the second UE (block 1330). For example, the UE (e.g., using transmission component 1404, depicted in FIG. 14) may selectively transmit, to the second UE, HARQ feedback for the sidelink communication based at least in part on a distance between the first UE and the second UE determined using the information relating to the height of the second UE, as described above.

Process 1300 may include additional aspects, such as any single aspect or any combination of aspects described below and/or in connection with one or more other processes described elsewhere herein.

In a first aspect, the SCI includes a 3D zone identifier associated with a location of the second UE.

In a second aspect, alone or in combination with the first aspect, the SCI includes a 2D zone identifier associated with a location of the second UE and an indication of the height of the second UE.

In a third aspect, alone or in combination with one or more of the first and second aspects, the SCI includes an indication of a MCR associated with the second UE, and selectively transmitting the HARQ feedback for the sidelink communication includes selectively transmitting, to the second UE, the HARQ feedback for the sidelink communication based at least in part on a determination of whether the distance between the first UE and the second UE is within the MCR associated with the second UE.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
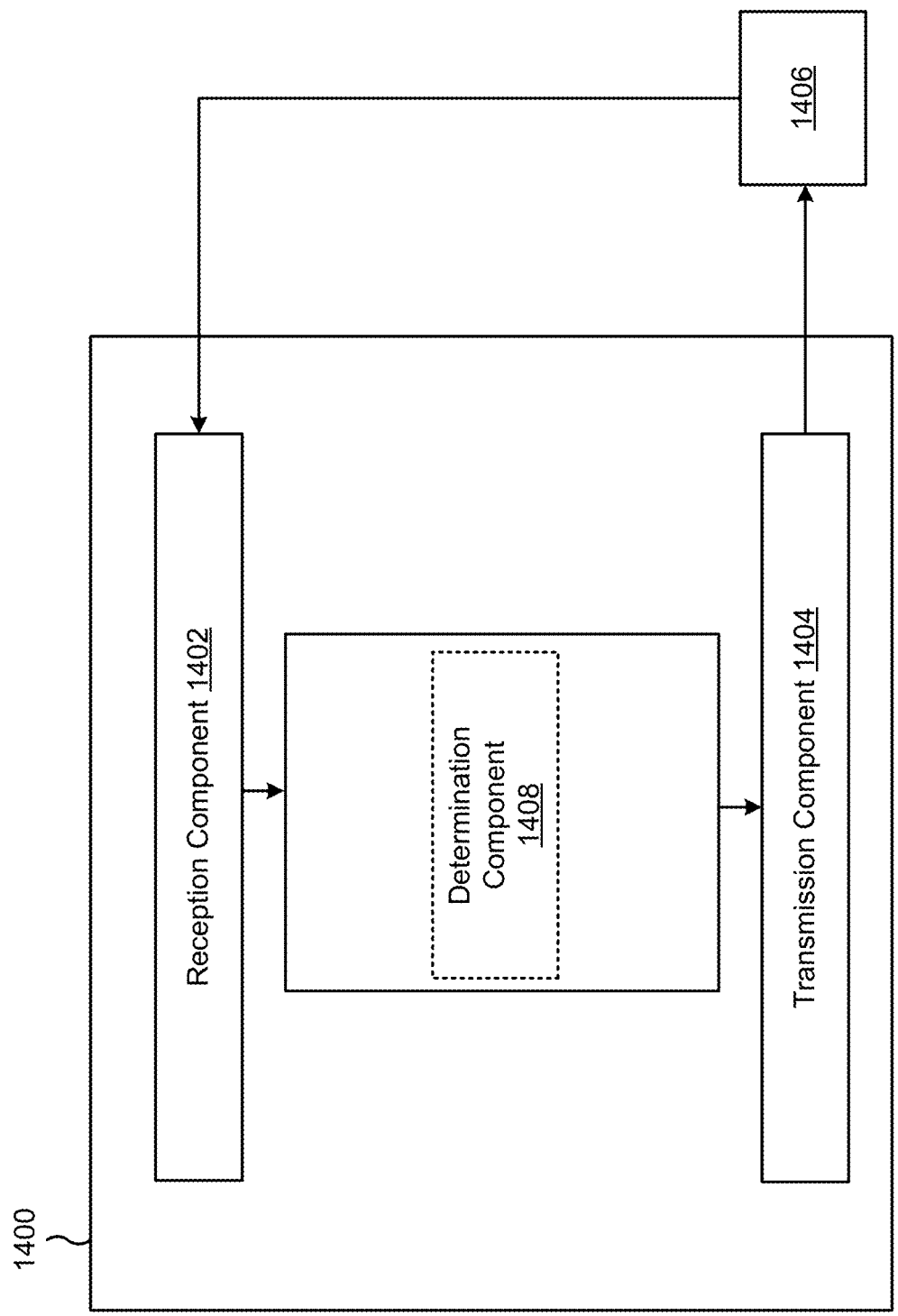
FIG. 14 is a block diagram of an example apparatus for wireless communication, in accordance with the present disclosure.

FIG. 14 is a block diagram of an example apparatus 1400 for wireless communication. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a determination component 1408, among other examples.

In some aspects, the apparatus 1400 may be configured to perform one or more operations described herein in connection with FIGS. 7-11. Additionally, or alternatively, the apparatus 1400 may be configured to perform one or more processes described herein, such as process 1200 of FIG. 12, process 1300 of FIG. 13, or a combination thereof. In some aspects, the apparatus 1400 and/or one or more components shown in FIG. 14 may include one or more components of the UE described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the UE described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the UE described above in connection with FIG. 2. In some aspects, the transmission component 1404 may be co-located with the reception component 1402 in a transceiver.

The transmission component 1404 and/or the reception component 1402 may establish a PC5 unicast link with a second UE. The transmission component 1404 may transmit, to a second UE in a PC5 RRC message, capability information that includes an indication that the UE is a UAV.

The reception component 1402 may receive, from the second UE, a PC5 RRC UE capability information message that includes an indication of whether the second UE is a UAV.

The transmission component 1404 may transmit, to the second UE, SCI relating to a PC5 unicast communication or a PC5 groupcast communication, wherein the SCI includes information relating to a height of the UE.

The transmission component 1404 may transmit, to the second UE in a PC5 RRC master information block message, an indication of a UAV status that indicates whether the first UE is on ground or in air.

The reception component 1402 may receive, from the second UE, a PC5 RRC reconfiguration message that includes a request for flying information.

The transmission component 1404 may transmit, to the second UE and based at least in part on receiving the PC5 RRC reconfiguration message, a PC5 RRC reconfiguration complete message that includes a flying information for the first UE, wherein the flying information includes at least one of a speed, direction, or elevation of the first UE.

The transmission component 1404 may transmit, to the second UE, a PC5 RRC measurement report message that includes a height report for the first UE.

The reception component 1402 may receive, from a second UE in a PC5 RRC message, capability information that includes an indication that the second UE is a UAV. The reception component 1402 may receive, from the second UE, SCI associated with a sidelink communication from the second UE, wherein the SCI includes information relating to a height of the second UE. The transmission component 1404 may selectively transmit, to the second UE, HARQ feedback for the sidelink communication based at least in part on a distance between the UE and the second UE determined using the information relating to the height of the second UE. The determination component 1408 may determine whether to transmit the HARQ feedback for the sidelink communication based at least in part on the distance between the UE and the second UE determined using the information relating to the height of the second UE.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a first user equipment (UE), comprising: establishing a PC5 unicast link with a second UE; and transmitting, to the second UE in a PC5 radio resource control (RRC) message, capability information that includes an indication that the first UE is an unmanned aerial vehicle (UAV).

Aspect 2: The method of Aspect 1, wherein transmitting the capability information comprises: transmitting the PC5 RRC message including the capability information to the second UE during establishment of the PC5 unicast link with the second UE.

Aspect 3: The method of any of Aspects 1-2, wherein the PC5 RRC message is a PC5 RRC UE capability enquiry message.

Aspect 4: The method of Aspect 3, wherein the PC5 RRC UE capability enquiry message includes, in a list of frequency bands, a dedicated UAV spectrum.

Aspect 5: The method of any of Aspects 3-4, further comprising: receiving, from the second UE, a PC5 RRC UE capability information message that includes an indication of whether the second UE is a UAV.

Aspect 6: The method of Aspect 5, wherein the PC5 RRC UE capability information message further includes an indication of an access stratum release supported by the second UE.

Aspect 7: The method of any of Aspects 1-2, wherein the PC5 RRC message is a PC5 RRC UE capability information message, and transmitting the capability information comprises: transmitting the PC5 RRC UE capability information message to the second UE based at least in part on receiving a PC5 RRC UE capability enquiry message from the second UE.

Aspect 8: The method of Aspect 7, wherein the PC5 RRC UE capability information message includes, in a list of supported frequency band combinations, a dedicated UAV spectrum.

Aspect 9: The method of any of Aspects 1-8, further comprising: transmitting, to the second UE, sidelink control information (SCI) relating to a PC5 unicast communication or a PC5 groupcast communication, wherein the SCI includes information relating to a height of the first UE.

Aspect 10: The method of Aspect 9, wherein the SCI includes a three-dimensional (3D) zone identifier associated with a location of the first UE.

Aspect 11: The method of Aspect 9, wherein the SCI includes a two-dimensional (2D) zone identifier associated with a location of the first UE and at least one of an indication of the height of the first UE or a vertical zone ID based on the height of the first UE.

Aspect 12: The method of any of Aspects 1-11, further comprising: transmitting, to the second UE in a PC5 RRC master information block message, an indication of a UAV status that indicates whether the first UE is on ground or in air.

Aspect 13: The method of any of Aspects 1-12, further comprising: receiving, from the second UE, a PC5 RRC reconfiguration message that includes a request for flying information; and transmitting, to the second UE and based at least in part on receiving the PC5 RRC reconfiguration message, a PC5 RRC reconfiguration complete message that includes a flying information for the first UE, wherein the flying information includes at least one of a speed, direction, or elevation of the first UE.

Aspect 14: The method of any of Aspects 1-13, further comprising: transmitting, to the second UE, a PC5 RRC measurement report message that includes a height report for the first UE.

Aspect 15: The method of Aspect 14, wherein the height report includes an indication of a height of the first UE relative to a ground.

Aspect 16: The method of Aspect 14, wherein the height report includes an indication of a height of the first UE relative to the second UE.

Aspect 17: A method of wireless communication performed by a first user equipment (UE), comprising: receiving, from a second UE in a PC5 radio resource control (RRC) message, capability information that includes an indication that the second UE is an unmanned aerial vehicle (UAV); receiving, from the second UE, sidelink control information (SCI) associated with a sidelink communication from the second UE, wherein the SCI includes information relating to a height of the second UE; and selectively transmitting, to the second UE, hybrid automatic repeat request (HARQ) feedback for the sidelink communication based at least in part on a distance between the first UE and the second UE determined using the information relating to the height of the second UE.

Aspect 18: The method of Aspect 17, wherein the SCI includes a three-dimensional (3D) zone identifier associated with a location of the second UE.

Aspect 19: The method of Aspect 17, wherein the SCI includes a two-dimensional (2D) zone identifier associated with a location of the second UE and at least one of an indication of the height of the first UE or a vertical zone ID based on the height of the first UE.

Aspect 20: The method of any of Aspects 17-19, wherein the SCI includes an indication of a minimum communication range (MCR) associated with the second UE, and selectively transmitting the HARQ feedback for the sidelink communication comprises: selectively transmitting, to the second UE, the HARQ feedback for the sidelink communication based at least in part on a determination of whether the distance between the first UE and the second UE is within the MCR associated with the second UE.

Aspect 21: An apparatus for wireless communication at a device, comprising a processor; memory coupled with the processor; and instructions stored in the memory and executable by the processor to cause the apparatus to perform the method of one or more Aspects of Aspects 1-16.

Aspect 22: An apparatus for wireless communication at a device, comprising a processor; memory coupled with the processor; and instructions stored in the memory and executable by the processor to cause the apparatus to perform the method of one or more Aspects of Aspects 17-20.

Aspect 23: A device for wireless communication, comprising a memory and one or more processors coupled to the memory, the memory and the one or more processors configured to perform the method of one or more Aspects of Aspects 1-16.

Aspect 24: A device for wireless communication, comprising a memory and one or more processors coupled to the memory, the memory and the one or more processors configured to perform the method of one or more Aspects of Aspects 17-20.

Aspect 25: An apparatus for wireless communication, comprising at least one means for performing the method of one or more Aspects of Aspects 1-16.

Aspect 26: An apparatus for wireless communication, comprising at least one means for performing the method of one or more Aspects of Aspects 17-20.

Aspect 27: A non-transitory computer-readable medium storing code for wireless communication, the code comprising instructions executable by a processor to perform the method of one or more Aspects of Aspects 1-16.

Aspect 28: A non-transitory computer-readable medium storing code for wireless communication, the code comprising instructions executable by a processor to perform the method of one or more Aspects of Aspects 17-20.

Aspect 29: A non-transitory computer-readable medium storing a set of instructions for wireless communication, the set of instructions comprising one or more instructions that, when executed by one or more processors of a device, cause the device to perform the method of one or more Aspects of Aspects 1-16.

Aspect 30: A non-transitory computer-readable medium storing a set of instructions for wireless communication, the set of instructions comprising one or more instructions that, when executed by one or more processors of a device, cause the device to perform the method of one or more Aspects of Aspects 17-20.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first user equipment (UE), comprising:
    establishing a PC5 unicast link with a second UE; and
    transmitting, to the second UE in a PC5 radio resource control (RRC) message, capability information that includes an indication that the first UE is an unmanned aerial vehicle (UAV), wherein the PC5 RRC message is a PC5 RRC UE capability enquiry message.

2. The method of claim 1, wherein transmitting the capability information comprises:
    transmitting the PC5 RRC message including the capability information to the second UE during establishment of the PC5 unicast link with the second UE.

3. The method of claim 1, wherein the PC5 RRC UE capability enquiry message includes, in a list of frequency bands, a dedicated UAV spectrum.

4. The method of claim 1, further comprising:
receiving, from the second UE, a PC5 RRC UE capability information message that includes an indication of whether the second UE is a UAV.

5. The method of claim 4, wherein the PC5 RRC UE capability information message further includes an indication of an access stratum release supported by the second UE.

6. A method of wireless communication performed by a first user equipment (UE), comprising:
establishing a PC5 unicast link with a second UE, and
transmitting, to the second UE in a PC5 radio resource control (RRC) message, capability information that includes an indication that the first UE is an unmanned aerial vehicle (UAV), wherein the PC5 RRC message is a PC5 RRC UE capability information message, and transmitting the capability information comprises:
transmitting the PC5 RRC UE capability information message to the second UE based at least in part on receiving a PC5 RRC UE capability enquiry message from the second UE.

7. The method of claim 6, wherein the PC5 RRC UE capability information message includes, in a list of supported frequency band combinations, a dedicated UAV spectrum.

8. The method of claim 1, further comprising:
transmitting, to the second UE, sidelink control information (SCI) relating to a PC5 unicast communication or a PC5 groupcast communication, wherein the SCI includes information relating to a height of the first UE.

9. The method of claim 8, wherein the SCI includes a three-dimensional (3D) zone identifier associated with a location of the first UE.

10. The method of claim 8, wherein the SCI includes a two-dimensional (2D) zone identifier associated with a location of the first UE and at least one of an indication of the height of the first UE or a vertical zone ID based on the height of the first UE.

11. A method of wireless communication performed by a first user equipment (UE), comprising:
establishing a PC5 unicast link with a second UE;
transmitting, to the second UE in a PC5 radio resource control (RRC) message, capability information that includes an indication that the first UE is an unmanned aerial vehicle (UAV); and
transmitting, to the second UE in a PC5 RRC master information block message, an indication of a UAV status that indicates whether the first UE is on ground or in air.

12. A method of wireless communication performed by a first user equipment (UE), comprising:
establishing a PC5 unicast link with a second UE;
transmitting, to the second UE in a PC5 radio resource control (RRC) message, capability information that includes an indication that the first UE is an unmanned aerial vehicle (UAV);
receiving, from the second UE, a PC5 RRC reconfiguration message that includes a request for flying information; and
transmitting, to the second UE and based at least in part on receiving the PC5 RRC reconfiguration message, a PC5 RRC reconfiguration complete message that includes a flying information for the first UE, wherein the flying information includes at least one of a speed, direction, or elevation of the first UE.

13. The method of claim 1, further comprising:
transmitting, to the second UE, a PC5 RRC measurement report message that includes a height report for the first UE.

14. The method of claim 13, wherein the height report includes an indication of a height of the first UE relative to a ground.

15. A method of wireless communication performed by a first user equipment (UE), comprising:
establishing a PC5 unicast link with a second UE,
transmitting, to the second UE in a PC5 radio resource control (RRC) message, capability information that includes an indication that the first UE is an unmanned aerial vehicle (UAV), and
transmitting, to the second UE, a PC5 RRC measurement report message that includes a height report for the first UE, wherein the height report includes an indication of a height of the first UE relative to the second UE.

16. A method of wireless communication performed by a first user equipment (UE), comprising:
receiving, from a second UE in a PC5 radio resource control (RRC) message, capability information that includes an indication that the second UE is an unmanned aerial vehicle (UAV);
receiving, from the second UE, sidelink control information (SCI) associated with a sidelink communication from the second UE, wherein the SCI includes information relating to a height of the second UE; and
transmitting, to the second UE, hybrid automatic repeat request (HARQ) feedback for the sidelink communication based at least in part on a distance between the first UE and the second UE determined using the information relating to the height of the second UE.

17. The method of claim 16, wherein the SCI includes a three-dimensional (3D) zone identifier associated with a location of the second UE.

18. The method of claim 16, wherein the SCI includes a two-dimensional (2D) zone identifier associated with a location of the second UE and at least one of an indication of the height of the first UE or a vertical zone ID based on the height of the first UE.

19. The method of claim 16, wherein the SCI includes an indication of a minimum communication range (MCR) associated with the second UE, and transmitting the HARQ feedback for the sidelink communication comprises:
transmitting, to the second UE, the HARQ feedback for the sidelink communication based at least in part on a determination of whether the distance between the first UE and the second UE is within the MCR associated with the second UE.

20. A first user equipment (UE) for wireless communication, comprising:
a memory; and
one or more processors, operatively coupled to the memory, configured to:
establish a PC5 unicast link with a second UE; and
transmit, to the second UE in a PC5 radio resource control (RRC) message, capability information that includes an indication that the first UE is an unmanned aerial vehicle (UAV), wherein the PC5 RRC message is a PC5 RRC UE capability enquiry message.

21. A first user equipment (UE) for wireless communication, comprising:
a memory; and one or more processors, operatively coupled to the memory, configured to:
   establish a PC5 unicast link with a second UE; and
   transmit, to the second UE in a PC5 radio resource control (RRC) message, capability information that includes an indication that the first UE is an unmanned aerial vehicle (UAV), wherein the PC5 RRC message is a PC5 RRC UE capability information message; and
   transmit the PC5 RRC UE capability information message to the second UE based at least in part on receiving a PC5 RRC UE capability enquiry message from the second UE.

22. The first UE of claim 20, wherein the one or more processors are further configured to:
   transmit, to the second UE, sidelink control information (SCI) relating to a PC5 unicast communication or a PC5 groupcast communication, wherein the SCI includes information relating to a height of the first UE.

23. The first UE of claim 22, wherein the SCI includes a three-dimensional (3D) zone identifier associated with a location of the first UE.

24. The first UE of claim 22, wherein the SCI includes a two-dimensional (2D) zone identifier associated with a location of the first UE and an indication of the height of the first UE.

25. A first user equipment (UE) for wireless communication, comprising:
a memory; and
one or more processors, operatively coupled to the memory, configured to:
   establish a PC5 unicast link with a second UE; and
   transmit, to the second UE in a PC5 radio resource control (RRC) message, capability information that includes an indication that the first UE is an unmanned aerial vehicle (UAV); and
   transmit, to the second UE in a PC5 RRC master information block message, an indication of a UAV status that indicates whether the first UE is on ground or in air.

26. A first user equipment (UE) for wireless communication, comprising:
a memory; and
one or more processors, operatively coupled to the memory, configured to:
   establish a PC5 unicast link with a second UE; and
   transmit, to the second UE in a PC5 radio resource control (RRC) message, capability information that includes an indication that the first UE is an unmanned aerial vehicle (UAV);
   receive, from the second UE, a PC5 RRC reconfiguration message that includes a request for flying information; and
   transmit, to the second UE and based at least in part on receiving the PC5 RRC reconfiguration message, a PC5 RRC reconfiguration complete message that includes a flying information for the first UE, wherein the flying information includes at least one of a speed, direction, or elevation of the first UE.

27. The first UE of claim 20, wherein the one or more processors are further configured to:
   transmit, to the second UE, a PC5 RRC measurement report message that includes a height report for the first UE.

28. A first user equipment (UE) for wireless communication, comprising:
a memory; and
one or more processors, operatively coupled to the memory, configured to:
   receive, from a second UE in a PC5 radio resource control (RRC) message, capability information that includes an indication that the second UE is an unmanned aerial vehicle (UAV);
   receive, from the second UE, sidelink control information (SCI) associated with a sidelink communication from the second UE, wherein the SCI includes information relating to a height of the second UE; and
   transmit, to the second UE, hybrid automatic repeat request (HARQ) feedback for the sidelink communication based at least in part on a distance between the first UE and the second UE determined using the information relating to the height of the second UE.

29. The first UE of claim 28, wherein the SCI includes a three-dimensional (3D) zone identifier associated with a location of the second UE.

30. The first UE of claim 28, wherein the SCI includes a two-dimensional (2D) zone identifier associated with a location of the second UE and at least one of an indication of the height of the first UE or a vertical zone ID based on the height of the first UE.

31. The first UE of claim 28, wherein the SCI includes an indication of a minimum communication range (MCR) associated with the second UE, and wherein that one or more processors are further configured to:
   transmit, to the second UE, the HARQ feedback for the sidelink communication based at least in part on a determination of whether the distance between the first UE and the second UE is within the MCR associated with the second UE.

\* \* \* \* \*